US011646405B2

(12) United States Patent
Yamashita et al.

(10) Patent No.: US 11,646,405 B2
(45) Date of Patent: May 9, 2023

(54) POSITIVE ELECTRODE ACTIVE SUBSTANCE FOR SECONDARY CELL AND METHOD FOR PRODUCING SAME

(71) Applicant: TAIHEIYO CEMENT CORPORATION, Minato-ku (JP)

(72) Inventors: Hiroki Yamashita, Sakura (JP);
Tomoki Hatsumori, Sakura (JP);
Atsushi Nakamura, Sakura (JP);
Takaaki Ogami, Sakura (JP)

(73) Assignee: TAIHEIYO CEMENT CORPORATION, Minato-ku (JP)

( * ) Notice: Subject to any disclaimer, the term of this patent is extended or adjusted under 35 U.S.C. 154(b) by 0 days.

(21) Appl. No.: 15/556,936

(22) PCT Filed: Sep. 17, 2015

(86) PCT No.: PCT/JP2015/076384
§ 371 (c)(1),
(2) Date: Sep. 8, 2017

(87) PCT Pub. No.: WO2016/143171
PCT Pub. Date: Sep. 15, 2016

(65) Prior Publication Data
US 2018/0053929 A1    Feb. 22, 2018

(30) Foreign Application Priority Data

Mar. 9, 2015   (JP) .............................. JP2015-045646
Mar. 26, 2015  (JP) .............................. JP2015-064390
Mar. 26, 2015  (JP) .............................. JP2015-064391
Sep. 9, 2015   (JP) .............................. JP2015-177530
Sep. 9, 2015   (JP) .............................. JP2015-177531
Sep. 9, 2015   (JP) .............................. JP2015-177532

(51) Int. Cl.
| | |
|---|---|
| H01M 4/133 | (2010.01) |
| H01M 4/04 | (2006.01) |
| H01M 4/62 | (2006.01) |
| H01M 4/36 | (2006.01) |
| H01M 4/1397 | (2010.01) |
| C01B 33/20 | (2006.01) |
| H01M 4/1393 | (2010.01) |
| C01B 25/45 | (2006.01) |
| C01B 33/32 | (2006.01) |
| H01M 4/136 | (2010.01) |
| H01M 4/58 | (2010.01) |
| H01M 4/587 | (2010.01) |
| H01M 4/02 | (2006.01) |

(52) U.S. Cl.
CPC ............ *H01M 4/133* (2013.01); *C01B 25/45* (2013.01); *C01B 33/20* (2013.01); *C01B 33/32* (2013.01); *H01M 4/0471* (2013.01); *H01M 4/136* (2013.01); *H01M 4/1393* (2013.01); *H01M 4/1397* (2013.01); *H01M 4/364* (2013.01); *H01M 4/366* (2013.01); *H01M 4/582* (2013.01); *H01M 4/587* (2013.01); *H01M 4/5825* (2013.01); *H01M 4/62* (2013.01); *H01M 4/625* (2013.01); *C01P 2006/40* (2013.01); *H01M 2004/028* (2013.01)

(58) Field of Classification Search
CPC ...................................................... H01M 4/133
See application file for complete search history.

(56) References Cited

U.S. PATENT DOCUMENTS

| | | | | |
|---|---|---|---|---|
| 3,761,465 | A | * | 9/1973 | Callihan ................. C08B 11/12 536/43 |
| 9,048,495 | B2 | * | 6/2015 | Sun .................... C01G 45/1221 |
| 2002/0195591 | A1 | | 12/2002 | Ravet et al. |
| 2004/0140458 | A1 | | 7/2004 | Ravet et al. |
| 2008/0131777 | A1 | | 6/2008 | Hatta et al. |
| 2009/0309072 | A1 | | 12/2009 | Hwang et al. |

(Continued)

FOREIGN PATENT DOCUMENTS

| | | |
|---|---|---|
| CN | 101156260 A | 4/2008 |
| CN | 102137811 A | 7/2011 |

(Continued)

OTHER PUBLICATIONS

Dokko et al, J. Mater. Chem., 2007, 17, pp. 4803-4810. (Year: 2007).*
International Search Report dated Dec. 22, 2015, in PCT/JP2015/076384, filed Sep. 17, 2015.
Huang et al., "Excellent electrochemical performance of $LiFe_{0.4}Mn_{0.6}PO_4$ microspheres produced using a double carbon coating process," Journal of Materials Chemistry A, vol. 2, 2014, pp. 18831-18837.

(Continued)

*Primary Examiner* — William D Young

(74) *Attorney, Agent, or Firm* — Oblon, McClelland, Maier & Neustadt, L.L.P.

(57) ABSTRACT

A positive electrode active substance for a secondary cell, where the positive electrode active substance is capable of suppressing adsorption of water effectively in order to obtain a high-performance lithium ion secondary cell or sodium ion secondary cell. The positive electrode active substance contains 0.3 to 5 mass % of graphite, 0.1 to 4 mass % of carbon obtained by carbonizing a water-soluble carbon material, or 0.1 to 5 mass % of a metal fluoride is supported on a composite containing a compound which contains at least iron or manganese, where the compound is represented by formula (A) $LiFe_aMn_bM_cPO_4$, formula (B) $Li_2Fe_eMn_fN_gSiO_4$, or formula (C) $NaFe_gMn_hQ_iPO_4$, and carbon obtained by carbonizing a cellulose nanofiber.

11 Claims, No Drawings

(56) References Cited

U.S. PATENT DOCUMENTS

| | | |
|---|---|---|
| 2010/0297496 A1 | 11/2010 | Ravet et al. |
| 2011/0008233 A1 | 1/2011 | Miyanaga et al. |
| 2011/0136014 A1 | 6/2011 | Kay |
| 2012/0003139 A1* | 1/2012 | Kawakami .......... H01M 4/5805 423/306 |
| 2012/0003540 A1 | 1/2012 | Nakano et al. |
| 2012/0258359 A1 | 10/2012 | Saka |
| 2014/0087258 A1 | 3/2014 | Kabe et al. |
| 2014/0147744 A1* | 5/2014 | Nemoto ................ H01M 4/136 429/211 |
| 2014/0339465 A1 | 11/2014 | Okamoto |
| 2015/0270554 A1 | 9/2015 | Gariepy et al. |
| 2015/0325855 A1* | 11/2015 | Kawakami ............. G04G 21/00 361/679.55 |

FOREIGN PATENT DOCUMENTS

| | | |
|---|---|---|
| CN | 102714302 A | 10/2012 |
| CN | 102916184 A | 2/2013 |
| CN | 103493265 A | 1/2014 |
| JP | 2001-15111 A | 1/2001 |
| JP | 2003-292309 A | 10/2003 |
| JP | 2008-260666 A | 10/2008 |
| JP | 2010-508234 A | 3/2010 |
| JP | 2010-251302 A | 11/2010 |
| JP | 2011-34963 A | 2/2011 |
| JP | 2011-210693 A | 10/2011 |
| JP | 2013-152911 A | 8/2013 |
| JP | 2013-225471 A | 10/2013 |
| JP | 2014-96308 A | 5/2014 |
| JP | 2014-096345 A | 5/2014 |
| JP | 2014-143032 A | 8/2014 |
| JP | 2014-191873 A | 10/2014 |
| JP | 2014-241229 A | 12/2014 |
| KR | 10-2014-0103117 A | 8/2014 |
| WO | 2005/041327 A1 | 5/2005 |
| WO | 2013/128936 A1 | 9/2013 |
| WO | 2014/063244 A1 | 5/2014 |

OTHER PUBLICATIONS

Combined Office Action and Search Report dated Nov. 27, 2018 in Taiwanese Patent Application No. 104130842, 5 pages (with English translation of categories of cited documents).

Extended European Search Report dated Oct. 4, 2018 in Patent Application No. 15884656.8, 6 pages.

Office Action dated Jun. 10, 2020 in corresponding Korean Patent Application No. 10-2017-7023595 (with English Translation), 12 pages.

Yujie Zhu et al., "Comparison of Electrochemical Performances of Olivine $NaFePO_4$ in Sodium-ion Batteries and Olivine $LiFePO_4$ in Lithium-ion Batteries", Nanoscale, vol. 5, 2013, pp. 780-787.

The First Office Action dated Jan. 21, 2020 in Chinese Patent Application No. 201580077600.0 with machine-generated English translation, 25 pages.

Office Action dated Jun. 19, 2020 in Chinese Patent Application No. 201580077600.0 (w/ Computer-generated English translation).

* cited by examiner

POSITIVE ELECTRODE ACTIVE SUBSTANCE FOR SECONDARY CELL AND METHOD FOR PRODUCING SAME

FIELD OF THE INVENTION

The present invention relates to a positive electrode active substance for a secondary cell, wherein graphite, carbon obtained by carbonizing a water-soluble carbon material, or a metal fluoride is supported on a composite comprising a compound and carbon obtained by carbonizing a cellulose nanofiber, and a method for producing the positive electrode active substance for a secondary cell.

BACKGROUND OF THE INVENTION

Development of secondary cells for use in portable electronic devices, hybrid vehicles, electric vehicles, or the like is conducted, and lithium ion secondary cells in particular are widely known as the most excellent secondary cell which operates at around room temperature. In such circumstances, lithium-containing olivine type metal phosphates such as Li(Fe, Mn)$PO_4$ and $Li_2$(Fe, Mn)$SiO_4$ are not greatly affected by resource restriction and exhibit higher safety when compared with lithium transition metal oxides such as $LiCoO_2$, and therefore become optimal positive electrode materials for obtaining high-output and large-capacity lithium ion secondary cells. These compounds, however, have a characteristic that it is difficult to enhance electrical conductivity sufficiently due to their crystal structures, and moreover, there is room for improvement in diffusibility of lithium ions, so that various developments have been conducted conventionally.

For example, in Patent Literature 1, an attempt to improve the performance of a cell obtained is made by making primary crystal particles ultrafine and shortening the diffusion distance of lithium ions in an olivine type positive electrode active substance. In addition, in Patent Literature 2, the output of a cell is made high by depositing a conductive carbonaceous material on the particle surface of a positive electrode active substance uniformly and obtaining a regular electric field distribution on the particle surface thereof. Further, in lithium ion secondary cells the spread of which is progressing, a phenomenon is known that when the cells are left to stand for long hours after charge, the internal resistance gradually increases to cause deterioration in cell performance. The phenomenon occurs because water contained in cell materials at the time of production is desorbed from the materials during repetition of charge and discharge of the cell, and hydrogen fluoride is produced through the chemical reaction between the desorbed water and nonaqueous electrolytic solution $LiPF_6$ with which the cell is impregnated. To suppress the deterioration in cell performance effectively, it is also known that it is effective to reduce the water content in a positive electrode active substance for use in a secondary cell as described in Patent literature 3.

Under the circumstance where it is desired to reduce the water content in a positive electrode active substance as described above, for example, Patent Literature 4 discloses a technique for reducing the water content to a certain value or less by conducting pulverization treatment or classification treatment under a dry atmosphere after pyrolysis treatment of a raw material mixture comprising a precursor of a carbonaceous substance. In addition, Patent Literature 5 discloses a technique for keeping a humidity level at a certain level or lower over the period of production, storage, and use of materials for a positive electrode by subjecting predetermined raw materials to synthesis reaction or the like in a dry atmosphere taking into consideration that there may be a case where an active substance obtained using a primary particle with the increased specific surface area contrarily becomes susceptible to deterioration due to wet air when the surface thereof is covered with carbon. Further, Patent Literature 6 discloses a technique for obtaining a composite oxide in which an electrically conductive carbon material is precipitated on the surface of the composite oxide uniformly by conducting mechanochemical treatment after mixing a predetermined lithium phosphate compound, lithium silicate compound, or the like with an electrically conductive carbon material using a wet ball mill.

On the other hand, lithium is a rare and valuable substance, and therefore various studies on sodium ion secondary cells using sodium in place of lithium ion secondary cells have started.

For example, Patent Literature 7 discloses an active substance for a sodium secondary cell using malysite type $NaMnPO_4$, Patent Literature 8 discloses a positive electrode active substance comprising a sodium transition metal phosphate having an olivine type structure, and both the literatures show that a high-performance sodium ion secondary cell is obtained.

CITATION LIST

Patent Literature

[Patent Literature 1] JP-A-2010-251302
[Patent Literature 2] JP-A-2001-15111
[Patent Literature 3] JP-A-2013-152911
[Patent Literature 4] JP-A-2003-292309
[Patent Literature 5] National Publication of International Patent Application No. 2010-508234
[Patent Literature 6] USP-A-2004-0140458
[Patent Literature 7] JP-A-2008-260666
[Patent Literature 8] JP-A-2011-34963

However, in any of the techniques described in the literatures, the steps for obtaining a cell possibly be complicated because a drying step for reducing the water content in the positive electrode active substance or other steps is daringly introduced, and besides, the surface of the lithium phosphate compound and the like is not still completely covered with a carbon source and a portion of the surface is exposed. Therefore, it appears that the adsorption of water cannot be suppressed and the water content is increased, and that it is difficult to obtain a positive electrode active substance for a secondary cell having a sufficiently high level of cell physical properties, such as cycle properties. The realization of not only a lithium ion secondary cell but also a sodium ion secondary cell as an alternative cell of the lithium ion secondary cell which are more useful is also desired.

Accordingly, it is a problem of the present invention is to provide: a positive electrode active substance for a secondary cell, to which a characteristic that water is hard to be adsorbed to the positive electrode active substance itself is imparted and in which the water content is reduced effectively, in order to obtain a high-performance lithium ion secondary cell or sodium ion secondary cell; and a method for producing the positive electrode active substance for a secondary cell.

SUMMARY OF THE INVENTION

Thus, the present inventors have conducted various studies to find that a positive electrode active substance for a secondary cell, wherein a particular amount of graphite, a particular amount of carbon obtained by carbonizing a water-soluble carbon material, or a particular amount of a metal fluoride is supported on a composite comprising: a particular compound; and carbon obtained by carbonizing a cellulose nanofiber, is extremely useful as a positive electrode active substance in which the amount of water is reduced effectively and lithium ions or sodium ions can contribute to electrical conduction effectively and have completed the present invention.

That is, the present invention provides a positive electrode active substance for a secondary cell, wherein 0.3 to 5 mass % of graphite, 0.1 to 4 mass % of carbon obtained by carbonizing a water-soluble carbon material, or 0.1 to 5 mass % of a metal fluoride is supported on a composite comprising:

a compound comprising at least iron or manganese, the compound being represented by formula (A), (B), or (C):

$$LiFe_aMn_bM^1_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying $0 \leq a \leq 1$, $0 \leq b \leq 1$, $0 \leq c \leq 0.2$, $2a+2b+$(valence of $M^1$)$\times c=2$, and $a+b \neq 0$;

$$Li_2Fe_dMn_eM^2_fSiO_4 \quad (B)$$

wherein $M^2$ represents Ni, Co, Al, Zn, V, or Zr, and d, e, and f each represent a number satisfying $0 \leq d \leq 1$, $0 \leq e \leq 1$, $0 \leq f < 1$, $2d+2e+$(valence of $M^2$)$\times f=2$, and $d+e \neq 0$; and $$NaFe_gMn_hQ_iPO_4 \quad (C)$$

wherein Q represents Mg, Ca, Co, Sr, Y, Zr, Mo, Ba, Pb, Bi, La, Ce, Nd, or Gd, and g, h, and i each represent a number satisfying $0 \leq g \leq 1$, $0 \leq h \leq 1$, $0 \leq i < 1$, $2g+2h+$(valence of Q)$\times i=2$, and $g+h \neq 0$; and carbon obtained by carbonizing a cellulose nanofiber.

Moreover, the present invention provides a method for producing a positive electrode active substance for a secondary cell, the positive electrode active substance being one wherein 0.3 to 5 mass % of graphite is supported on a composite comprising:

a compound comprising at least iron or manganese, the compound being represented by formula (A), (B), or (C):

$$LiFe_aMn_bW_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying $0 \leq a \leq 1$, $0 \leq b \leq 1$, $0 \leq c \leq 0.2$, $2a+2b+$(valence of $M^1$)$\times c=2$, and $a+b \cdot 0$;

$$Li_2Fe_dMn_eM^2_fSiO_4 \quad (B)$$

wherein $M^2$ represents Ni, Co, Al, Zn, V, or Zr, and d, e, and f each represent a number satisfying $0 \leq d \leq 1$, $0 \leq e \leq 1$, $0 \leq f < 1$, $2d+2e+$(valence of $M^2$)$\times f=2$, and $d+e \neq 0$; and $$NaFe_gMn_hQ_iPO_4 \quad (C)$$

wherein Q represents Mg, Ca, Co, Sr, Y, Zr Mo, Ba, Pb, Bi, La, Ce, Nd, or Gd, and g, h, and i each represent a number satisfying $0 \leq g \leq 1$, $0 \leq h \leq 1$, $0 \leq i < 1$, $2g+2h+$(valence of Q)$\times i=2$, and $g+h \neq 0$; and carbon obtained by carbonizing a cellulose nanofiber, and the method comprising:

a step (I-1) of mixing a phosphoric acid compound or a silicic acid compound with a mixture (X-1) comprising: a lithium compound or a sodium compound; and a cellulose nanofiber, thereby obtaining a composite (X-1);

a step (II-1) of subjecting slurry (Y-1) comprising: the obtained composite (X-1); and a metal salt comprising at least an iron compound or a manganese compound to hydrothermal reaction, thereby obtaining a composite (Y-1);

a step (III-1) of adding the graphite to the obtained composite (Y-1) to conduct mixing for 6 to 90 minutes while applying compressive force and shear force, thereby obtaining a composite (Z-1); and a step (IV-1) of pyrolyzing the obtained composite (Z-1) in a reducing atmosphere or an inert atmosphere.

Further, the present invention provides a method for producing a positive electrode active substance for a secondary cell, the positive electrode active substance being one wherein 0.1 to 4 mass % of carbon obtained by carbonizing a water-soluble carbon material, or 0.1 to 5 mass % of a metal fluoride is supported on a composite comprising:

a compound comprising at least iron or manganese, the compound being represented by formula (A), (B), or (C):

$$LiFe_aMn_bW_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying $0 \leq a \leq 1$, $0 \leq b \leq 1$, $0 \leq c \leq 0.2$, $2a+2b+$(valence of $M^1$)$\times c=2$, and $a+b \neq 0$;

$$Li_2Fe_dMn_eM^2_fSiO_4 \quad (B)$$

wherein $M^2$ represents Ni, Co, Al, Zn, V, or Zr, and d, e, and f each represent a number satisfying $0 \leq d \leq 1$, $0 \leq e \leq 1$, $0 \leq f < 1$, $2d+2e+$(valence of $M^2$)$\times f=2$, and $d+e \neq 0$; and $$NaFe_gMn_hQ_iPO_4 \quad (C)$$

wherein Q represents Mg, Ca, Co, Sr Y, Zr, Mo, Ba, Pb Bi, La, Ce, Nd, or Gd, and g, h, and i each represent a number satisfying $0 \leq g \leq 1$, $0 \leq h \leq 1$, $0 \leq i < 1$, $2g+2h+$(valence of Q)$\times i=2$, and $g+h \neq 0$; and carbon obtained by carbonizing a cellulose nanofiber, and the method comprising:

a step (I-2) of mixing a phosphoric acid compound or a silicic acid compound with a mixture (X-2) comprising: a lithium compound or a sodium compound; and a cellulose nanofiber, thereby obtaining a composite (X-2);

a step (II-2) of subjecting slurry (Y-2) comprising: the obtained composite (X-2); and a metal salt comprising at least an iron compound or a manganese compound to hydrothermal reaction, thereby obtaining a composite (Y-2); and a step (III-2) of adding 0.1 to 16 mass parts of a water-soluble organic compound to the obtained composite (Y-2) based on 100 mass parts of the composite (Y-2) or adding 0.1 to 40 mass parts of a precursor of the metal fluoride to the obtained composite (Y-2) based on 100 mass parts of the composite (Y-2) and conducting wet mixing and then pyrolyzing.

According to the present invention, when a particular amount of graphite, a particular amount of carbon obtained by carbonizing a water-soluble carbon material, or a particular amount of a metal fluoride is supported on a composite comprising: a predetermined compound; and carbon obtained by carbonizing a cellulose nanofiber, the graphite, the carbon obtained by carbonizing the water-soluble carbon material, or the metal fluoride is supported effectively even at a site where the carbon obtained by carbonizing the cellulose nanofiber does not exist and the compound is exposed in a portion of the surface of the composite, so that a positive electrode active substance for a secondary cell, in which the exposed portion on the surface of the compound is reduced effectively, can be obtained. Therefore, a characteristic that water is hard to adsorb can be imparted effectively to the positive electrode active substance for a secondary cell without introducing a strong drying step, so that, in a lithium ion secondary cell or a sodium ion secondary cell using such positive electrode active substance for a secondary cell, lithium ions or sodium ions contribute to electrical conduction effectively and excellent cell properties can be exhibited stably even under various use environments.

Hereinafter, the present invention will be described in detail.

In a positive electrode active substance for a secondary cell according to the present invention, 0.3 to 5 mass % of graphite, 0.1 to 4 mass % of carbon obtained by carbonizing a water-soluble carbon material, or 0.1 to 5 mass % of a metal fluoride is supported on a composite comprising: a compound comprising at least iron or manganese, the compound being represented by formula (A), (B), or (C):

$$LiFe_aMn_bM^1_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying $0 \le a \le 1$, $0 \le b \le 1$, $0 \le c \le 0.2$, $2a+2b+(\text{valence of } M^1) \times c=2$, and $a+b \ne 0$;

$$Li_2Fe_dMn_eM^2_fSiO_4 \quad (B)$$

wherein $M^2$ represents Ni, Co, Al, Zn, V, or Zr, and d, e, and f each represent a number satisfying $0 \le c \le 1$, $0 \le e \le 1$, $0 \le f < 1$, $2d+2e+(\text{valence of } M^2) \times f=2$, and $d+e \ne 0$; and $$NaFe_gMn_hQ_iPO_4 \quad (C)$$

wherein Q represents Mg, Ca, Co, Sr, Y, Zr, Mo, Ba, Pb, Bi, La, Ce, Nd, or Gd, and g, h, and i each represent a number satisfying $0 \le g \le 1$, $0 \le h \le 1$, $0 \le i < 1$, $2g+2h+(\text{valence of } Q) \times i=2$, and $g+h \ne 0$; and carbon obtained by carbonizing a cellulose nanofiber. That is specific examples of the positive electrode active substance for a secondary cell according to the present invention include the positive electrode active substance (P-1) for a secondary cell, wherein 0.3 to 5 mass % of the graphite is supported on the composite comprising: the compound; and the carbon obtained by carbonizing the cellulose nanofiber, the positive electrode active substance (P-2a) for a secondary cell, wherein 0.1 to 4 mass % of the carbon obtained by carbonizing the water-soluble carbon material is supported on the composite comprising: the compound; and the carbon obtained by carbonizing the cellulose nanofiber, and the positive electrode active substance (P-2b) for a secondary cell, wherein 0.1 to 5 mass % of the metal fluoride is supported on the composite comprising: the compound; and the carbon obtained by carbonizing the cellulose nanofiber.

The compound for use in the present invention comprises at least iron or manganese and represented by any of the following formulas (A), (B), and (C):

$$LiFe_aMn_bM^1_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying $0 \le a \le 1$, $0 \le b \le 1$, $0 \le c \le 0.2$, $2a+2b+(\text{valence of } M^1) \times c=2$, and $a+b \ne 0$;

$$Li_2Fe_dMn_eM^2_fSiO_4 \quad (B)$$

wherein $M^2$ represents Ni, Co, Al, Zn, V, or Zr, and d, e, and f each represent a number satisfying $0 \le d \le 1$, $0 \le e \le 1$, $0 \le f < 1$, $2d+2e+(\text{valence of } M^2) \times f=2$, and $d+e \ne 0$; and $$NaFe_gMn_hQ_iPO_4 \quad (C)$$

wherein Q represents Mg, Ca, Co, Sr, Y, Zr, Mo, Ba, Pb, Bi, La, Ce, Nd, or Gd, and g, h, and i each represent a number satisfying $0 \le g \le 1$, $0 \le h \le 1$, $0 \le i < 1$, $2g+2h+(\text{valence of } Q) \times i=2$, and $g+h \ne 0$.

All these compounds have an olivine type structure and comprise at least iron or manganese. In the case where the compound represented by the formula (A) or the formula (B) is used, the positive electrode active substance for a lithium ion cell is obtained, and in the case where the compound represented by the formula (C) is used, the positive electrode active substance for a sodium ion cell is obtained.

The compound represented by the formula (A) is a so-called olivine type lithium transition metal phosphate compound which comprises at least iron (Fe) and manganese (Mn) as transition metals. In the formula (A), $M^1$ represents Mg, Ca, Sr, Y, Zr, Mo, Ba, Pb, Bi, La, Ce, Nd, or Gd and is preferably Mg, Zr, Mo, or Co. a satisfies $0 \le a \le 1$, preferably $0.01 \le a \le 0.99$, and more preferably $0.1 \le a \le 0.9$. b satisfies $0 \le b \le 1$, preferably $0.01 \le b \le 0.99$, and more preferably $0.1 \le b \le 0.9$. c satisfies $0 \le c \le 0.2$, preferably $0 \le c \le 0.1$. Moreover, a, b, and c are each a number satisfying $2a+2b+(\text{valence of } M^1) \times c=2$ and $a+b \ne 0$. Specific examples of the olivine type lithium transition metal phosphate compound represented by the formula (A) include $LiFe_{0.2}Mn_{0.8}PO_4$, $LiFe_{0.9}Mn_{0.1}PO_4$, $LiFe_{0.15}Mn_{0.75}Mg_{0.1}PO_4$, and $LiFe_{0.19}Mn_{0.75}Zr_{0.03}PO_4$, and among the olivine type lithium transition metal phosphate compounds, $LiFe_{0.2}Mn_{0.8}PO_4$ is preferable.

The compound represented by the formula (B) is a so-called olivine type lithium transition metal silicate compound comprising at least iron (Fe) and manganese (Mn) as transition metals. In the formula (B), $M^2$ represents Ni, Co, Al, Zn, V, or Zr and is preferably Co, Al Zn, V, or Zr. d satisfies $0 \le d \le 1$, preferably $0 \le e < 1$, and more preferably $0.1 \le d \le 0.6$. e satisfies $0 \le e \le 1$, preferably $0 \le e < 1$, and more preferably $0.1 \le e \le 0.6$. f satisfies $0 \le f < 1$, preferably $0 < f < 1$, and more preferably $0.05 \le f \le 0.4$. Moreover, d, e, and f are each a number satisfying $2d+2e+(\text{valence of } N) \times f=2$, and $d+e \ne 0$. Specific examples of the olivine type lithium transition metal silicate compound represented by the formula (B) include $Li_2Fe_{0.45}Mn_{0.45}Co_{0.1}SiO_4$, $Li_2Fe_{0.36}Mn_{0.54}Al_{0.066}SiO_4$, $Li_2Fe_{0.45}Mn_{0.45}Zn_{0.1}SiO_4$, $Li_2Fe_{0.36}Mn_{0.54}V_{0.066}SiO_4$, and $Li_2Fe_{0.282}Mn_{0.658}Zr_{0.02}SiO_4$, and among the olivine type lithium transition metal silicate compounds, $Li_2Fe_{0.282}Mn_{0.658}Zr_{0.02}SiO_4$ is preferable.

The compound represented by the formula (C) is a so-called olivine type sodium transition metal phosphate compound comprising at least iron (Fe) and manganese (Mn) as transition metals. In the formula (C), Q represents Mg, Ca, Co, Sr, Y, Zr, Mo, Ba, Pb, Bi, La, Ce, Nd, or Gd and is preferably Mg, Zr, Mo, or Co. g satisfies $0 \le g \le 1$, preferably $0 < g \le 1$. h satisfies $0 \le h \le 1$, preferably $0.5 \le h < 1$. i satisfies $0 \le i < 1$, preferably $0 \le i \le 0.5$, and more preferably $0 \le i \le 0.3$. Moreover, g, h, and i are each a number satisfying $0 \le g \le 1$, $0 \le h \le 1$, $0 \le i < 1$, $2g+2h+(\text{valence of } Q) \times i=2$, and $g+h \ne 0$. Specific examples of the olivine type sodium transition metal phosphate compound represented by the formula (C) include $NaFe_{0.2}Mn_{0.8}PO_4$, $NaFe_{0.9}Mn_{0.1}PO_4$, $NaFe_{0.15}Mn_{0.7}Mg_{0.15}PO_4$, $NaFe_{0.19}Mn_{0.75}Zr_{0.03}PO_4$, $NaFe_{0.19}Mn_{0.75}Mo_{0.03}PO_4$, and $NaFe_{0.15}Mn_{0.7}Co_{0.15}PO_4$, and among the olivine type sodium transition metal phosphate compounds, $NaFe_{0.2}Mn_{0.8}PO_4$ is preferable.

In the positive electrode active substance for a secondary cell according to the present invention, the graphite, the carbon obtained by carbonizing the water-soluble carbon material, or the metal fluoride is supported on the composite comprising: the compound represented by the formula (A), (B), or (C); and the carbon obtained by carbonizing the cellulose nanofiber. That is, the positive electrode active substance for a secondary cell according to the present invention is obtained by using the cellulose nanofiber as a carbon source, and the cellulose nanofiber contained in the composite (primary particle) comprising the compound and the cellulose nanofiber is supported on the compound firmly as the carbon obtained through carbonization (carbon derived from cellulose nanofiber). The cellulose nanofiber is a skeleton component which accounts for about 50% of all the plant cell walls and is a light-weight and high-strength fiber which can be obtained by defibrating a plant fiber constituting the cell walls to nano size or other treatment and which also has a satisfactory dispersibility into water. In addition, a periodic structure is formed by carbon in a molecular chain of cellulose constituting the cellulose nanofiber, and therefore by the cellulose nanofiber carbonized and supported on the compound firmly, together with the graphite, the carbon obtained by carbonizing the water-soluble carbon material (carbon derived from water-soluble carbon material), or the metal fluoride, a useful positive electrode active substance which can efficiently enhance discharge properties in a secondary cell to be obtained can be obtained.

The cellulose nanofiber which can be used is not particularly limited as long as the cellulose nanofiber is obtained by defibrating a plant fiber constituting the plant cell walls to a nanosize or by other treatment, and, for example, products sold on the market such as CELISH KY-100S (manufactured by Daicel FineChem Ltd.) can be used. The fiber diameter of the cellulose nanofiber is preferably 4 to 500 nm, more preferably 5 to 400 nm, and still more preferably 10 to 300 nm from the viewpoint of allowing the cellulose nanofiber to be supported on the compound firmly.

The cellulose nanofiber is thereafter carbonized to exist as carbon supported on the compound in the positive electrode active substance for a secondary cell according to the present invention. The amount of the cellulose nanofiber expressed in terms of carbon atoms is preferably 0.5 to 15 mass %, more preferably 0.7 to 10 mass % in the positive electrode active substance for a secondary cell according to the present invention. More specifically, in the positive electrode active substance for a secondary cell, wherein the compound is represented by the formula (A) or (C), the amount of the cellulose nanofiber expressed in terms of carbon atoms is preferably 0.5 to 5 mass %, more preferably 0.7 to 3.5 mass %, and in the positive electrode active substance for a secondary cell, wherein the compound is represented by the formula (B), the amount is preferably 0.5 to 15 mass %, more preferably 1 to 10 mass %. The amount of the cellulose nanofiber existing in the positive electrode active substance for a secondary cell and expressed in terms of carbon atoms can be checked by: in the case of the positive electrode active substance (P-1) for a secondary cell, subtracting the amount of the graphite added later from the amount of carbon measured using a carbonsulfur analyzing apparatus; in the case of the positive electrode active substance (P-2a) for a secondary cell, subtracting the amount of carbon of the water-soluble carbon material added later from the amount of carbon measured using a carbonsulfur analyzing apparatus; and in the case of the positive electrode active substance (P-2b) for a secondary cell, the amount of carbon of the positive electrode active substance (P-2b) for a secondary cell.

Specifically, the composite (primary particle) comprising the compound and the cellulose nanofiber is preferably obtained by subjecting slurry comprising: a lithium compound or a sodium compound; a phosphoric acid compound or a silicic acid compound; at least an iron compound or a manganese compound; and the cellulose nanofiber to hydrothermal reaction. That is, the composite (primary particle) is preferably a hydrothermal reaction product of the slurry comprising: the lithium compound or the sodium compound; the phosphoric acid compound or the silicic acid compound; at least the iron compound or the manganese compound; and the cellulose nanofiber.

In the case where the positive electrode active substance for a secondary cell according to the present invention is the positive electrode active substance (P-1) for a secondary cell, wherein 0.3 to 5 mass % of the graphite is supported on the composite comprising: the compound; and the carbon obtained by carbonizing the cellulose nanofiber, the positive electrode active substance (P-1) for a secondary cell is obtained by using the cellulose nanofiber and the graphite as carbon sources, and both the carbon obtained by carbonizing the cellulose nanofiber contained in the composite and the graphite are supported on the compound firmly.

The graphite to be supported on the compound represented by the formula (A), (B), or (C) may be any of artificial graphite (flake, vein, earthy, graphene) and natural graphite. The BET specific surface area of the graphite which can be used is preferably 1 to 750 $m^2/g$, more preferably 3 to 500 $m^2/g$ from the viewpoint of reducing the amount of adsorbed water effectively. In addition, the average particle diameter of the graphite is preferably 0.5 to 20 μm, more preferably 1.0 to 15 μm from the same viewpoint.

More specifically, in the positive electrode active substance (P-1) for a secondary cell, the compound is preferably obtained by a production method comprising:

a step (I-1) of mixing the phosphoric acid compound or the silicic acid compound with a mixture (X-1) comprising: the lithium compound or the sodium compound; and the cellulose nanofiber, thereby obtaining a composite (X-1); and a step (II-1) of subjecting slurry (Y-1) comprising: the obtained composite (X-1); and a metal salt comprising at least the iron compound or the manganese compound to hydrothermal reaction, thereby obtaining a composite (Y-1)

The step (I-1) is a step of mixing the phosphoric acid compound or the silicic acid compound with the mixture (X-1) comprising: the lithium compound or the sodium compound; and the cellulose nanofiber, thereby obtaining the composite (X-1).

Examples of the lithium compound or the sodium compound which can be used include hydroxides (for example, $LiOH.H_2O$, NaOH), carbonated products, sulfonated products, and acetylated products. Among them, hydroxides are preferable.

The content of the lithium compound or the sodium compound in the mixture (X-1) is preferably 5 to 50 mass parts, more preferably 7 to 45 mass parts based on 100 mass parts of water. More specifically, in the case where the phosphoric acid compound is used in the step (I-1), the content of the lithium compound or the sodium compound in the mixture (X-1) is preferably 5 to 50 mass parts, more preferably 10 to 45 mass parts based on 100 mass parts of water. In the case where the silicic acid compound is used, the content of the silicic acid compound in the mixture (X-1) is preferably 5 to 40 mass parts, more preferably 7 to 35 mass parts based on 100 mass parts of water.

The content of the cellulose nanofiber in the mixture (X-1) is, for example, preferably 0.5 to 60 mass parts, more preferably 0.8 to 40 mass parts based on 100 mass parts of water in the mixture (X-1). More specifically, in the case where the phosphoric acid compound is used in the step (I-1), the content of the cellulose nanofiber in the mixture (X-1) is preferably 0.5 to 20 mass parts, more preferably 0.8 to 15 mass parts. In the case where the silicic acid compound is used, the content of the cellulose nanofiber in the mixture (X-1) is preferably 0.5 to 60 mass parts, more preferably 1 to 40 mass parts.

It is preferable to stir the mixture (X-1) in advance before mixing the phosphoric acid compound or the silicic acid compound with the mixture (X-1). The time for stirring the mixture (X-1) is preferably 1 to 15 minutes, more preferably 3 to 10 minutes. In addition, the temperature of the mixture (X-1) is preferably 20 to 90° C., more preferably 20 to 70° C.

Examples of the phosphoric acid compound for use in the step (I-1) include orthophosphoric acid ($H_3PO_4$, phosphoric acid), metaphosphoric acid, pyrophosphoric acid, triphosphoric acid, tetraphosphoric acid, ammonium phosphate, and ammonium hydrogenphosphate. Among the phosphoric acid compounds, it is preferable to use phosphoric acid, and it is preferable to use phosphoric acid as an aqueous solution having a concentration of 70 to 90 mass %. In the step (I-1), when phosphoric acid is mixed with the mixture (X-1), it is preferable to drop phosphoric acid while stirring the mixture (X-1). When phosphoric acid is added to the mixture (X-1) little by little through dropping, the reaction progresses in the mixture (X-1) satisfactorily to produce the composite (X-1) while the composite (X-1) is uniformly dispersed in the slurry, and even unnecessary aggregation of the composite (X-1) can be suppressed efficiently.

The speed of dropping phosphoric acid into the mixture (X-1) is preferably 15 to 50 mL/min, more preferably 20 to 45 mL/min, and still more preferably 28 to 40 mL/min. In addition, the time for stirring the mixture (X-1) while dropping phosphoric acid is preferably 0.5 to 24 hours, more preferably 3 to 12 hours. Further, the speed of stirring the mixture (X-1) while dropping phosphoric acid is preferably 200 to 700 rpm, more preferably 250 to 600 rpm, and still more preferably 300 to 500 rpm.

It is to be noted that when the mixture (X-1) is stirred, it is preferable to cool the mixture (X-1) to a temperature equal to or lower than the boiling point of the mixture (X-1). Specifically, it is preferable to cool the mixture (X-1) to a temperature of 80° C. or lower, more preferably to a temperature of 20 to 60° C.

The silicic acid compound for use in the step (I-1) is not particularly limited as long as the silicic acid compound is a silica compound having reactivity, and examples include amorphous silica and $Na_4SiO_4$ (for example, $Na_4SiO_4 \cdot H_2O$).

It is preferable that the mixture (X-1) after mixing the phosphoric acid compound or the silicic acid compound comprise 2.0 to 4.0 mol of lithium or sodium, more preferably 2.0 to 3.1 mol based on 1 mol of phosphoric acid or silicic acid, and the lithium compound or the sodium compound, and the phosphoric acid compound or the silicic acid compound may be used so that the amounts thereof may be as such. More specifically, in the case where the phosphoric acid compound is used in the step (I-1), it is preferable that the mixture (X-1) after mixing the phosphoric acid compound comprise 2.7 to 3.3 mol of lithium or sodium, more preferably 2.8 to 3.1 mol based on 1 mol of phosphoric acid, and in the case where the silicic acid compound is used in the step (I-1), it is preferable that the mixture (X-1) after mixing the silicic acid compound comprise 2.0 to 4.0 mol of lithium, more preferably 2.0 to 3.0 mol based on 1 mol of silicic acid.

By conducting a nitrogen purge to the mixture (X-1) after mixing the phosphoric acid compound or the silicic acid compound, the reaction in the mixture is completed to produce the composite (X-1) which is a precursor of the compound represented by the formulas (A) to (C) in the mixture. When the nitrogen purge is conducted, the reaction can be made to proceed in a state where the dissolved oxygen concentration in the mixture (X-1) is reduced, and moreover, the dissolved oxygen concentration in the mixture which comprises the obtained composite (X-1) is also reduced effectively, so that oxidation of the iron compound, the manganese compounds, and the like to be added in the next step can be suppressed. In the mixture which comprises the composite (X-1), the precursor of the compound represented by the formulas (A) to (C) exists as a fine dispersed particle. The composite (X-1) is obtained, for example, as a composite of trilithium phosphate ($Li_3PO_4$) and the cellulose nanofiber in the case of the compound represented by the formula (A).

The pressure in conducting the nitrogen purge is preferably 0.1 to 0.2 MPa, more preferably 0.1 to 0.15 MPa. In addition, the temperature of the mixture (X-1) after mixing the phosphoric acid compound or the silicic acid compound is preferably 20 to 80° C., more preferably 20 to 60° C. For example, in the case of the compound represented by the formula (A), the reaction time is preferably 5 to 60 minutes, more preferably 15 to 45 minutes.

In addition, when the nitrogen purge is conducted, it is preferable to stir the mixture (X-1) after mixing the phosphoric acid compound or the silicic acid compound from the viewpoint of allowing the reaction to progress satisfactorily. The stirring speed in this case is preferably 200 to 700 rpm, more preferably 250 to 600 rpm.

In addition, it is preferable to make the dissolved oxygen concentration in the mixture (X-1) after mixing the phosphoric acid compound or the silicic acid compound 0.5 mg/L or lower, more preferably 0.2 mg/L or lower from the viewpoint of suppressing the oxidation at the surface of the dispersed particle of the composite (X-1) more effectively and making the dispersed particle fine.

The step (II-1) is a step of subjecting the slurry (Y-1) comprising: the composite (X-1) obtained in the step (I-1), and the metal salt comprising at least the iron compound or the manganese compound to hydrothermal reaction, thereby obtaining the composite (Y-1). It is preferable that the composite (X-1) obtained through the step (I-1) be used as it is as the mixture and used as the precursor of the compound represented by the formulas (A) to (C) and the metal salt comprising at least the iron compound or the manganese compound be added to the composite (X-1) to use the resultant mixture as the slurry (Y-1). Thereby, the compound represented by the formulas (A) to (C) becomes an extremely fine particle while the steps are simplified, and the carbon derived from the cellulose nanofiber can be supported on the compound effectively in the subsequent step, so that an extremely useful positive electrode active substance for a secondary cell can be obtained.

Examples of the iron compound which can be used include iron acetate, iron nitrate, and iron sulfate. These iron compounds may be used singly or in a combination of two or more. Among the iron compounds, iron sulfate is preferable from the viewpoint of enhancing cell properties.

Examples of the manganese compound which can be used include manganese acetate, manganese nitrate, and manganese sulfate. These manganese compounds may be used singly or in a combination of two or more. Among the manganese compounds, manganese sulfate is preferable from the viewpoint of enhancing the cell properties.

In the case where both the iron compound and the manganese compound are used as the metal salt, the molar ratio of the manganese compound used and the iron compound used (manganese compound:iron compound) is preferably 99:1 to 1:99, more preferably 90:10 to 10:90. In addition, the total amount of the iron compound and the manganese compound added is preferably 0.99 to 1.01 mol, more preferably 0.995 to 1.005 mol based on 1 mol of $Li_3PO_4$ contained in the slurry (Y-1).

Further, a metal (M, N, or Q) salt other than the iron compound and the manganese compound may be used as the metal salt as necessary. In the metal (M, N, or Q) salt, M, N, and Q have the same meaning as M, N, and Q in the formulas (A) to (C), and as the metal salt, sulfates, halogen compounds, organic acid salts, hydrates thereof, and the like can be used. These metal salts may be used singly, or two or more of these metal salts may be used. Among the metal salts, sulfates are more preferably used from the viewpoint of enhancing the cell properties.

In the case where these metal (M, N, or Q) salts are used, the total amount of the iron compound, manganese compound, and metal salts (M, N, or Q) added is preferably 0.99 to 1.01 mol, more preferably 0.995 to 1.005 mol based on 1 mol of phosphoric acid or silicic acid in the mixture obtained through the step (I-1).

The amount of water for use in conducting the hydrothermal reaction is preferably 10 to 50 mol, more preferably 12.5 to 45 mol based on 1 mol of phosphoric acid ion or silicic acid ion contained in the slurry (Y-1) from the viewpoint of solubility of the metal salt to be used, easiness of stirring, efficiency of synthesis, and the like. More specifically, in the case where the ion contained in the slurry (Y-1) is a phosphate ion, the amount of water for use in conducting the hydrothermal reaction is preferably 10 to 30 mol, more preferably 12.5 to 25 mol. In the case where the ion contained in the slurry (Y-1) is a silicate ion, the amount of water for use in conducting the hydrothermal reaction is preferably 10 to 50 mol, more preferably 12.5 to 45 mol.

In the step (II-1), the order of addition of the iron compound, the manganese compound, and the metal (M, N, or Q) salt is not particularly limited. In addition, an antioxidant may be added as necessary with these metal salts. As the antioxidant, sodium sulfite ($Na_2SO_3$), sodium hydrosulfite ($Na_2S_2O_4$), ammonia water, and the like can be used. The amount of the antioxidant added is preferably 0.01 to 1 mol, more preferably 0.03 to 0.5 mol based on 1 mol of the total amount of the iron compound, manganese compound, and the metal (M, N, or Q) salt which is added as necessary from the viewpoint of preventing suppression of the production of the compound represented by the formulas (A) to (C) caused by excessive addition of the antioxidant.

The content of the composite (Y-1) in the slurry (Y-1) obtained by adding the iron compound, the manganese compound, and the metal (M, N, or Q) salt or the antioxidant which is used as necessary is preferably 10 to 50 mass %, more preferably 15 to 45 mass %, and more preferably 20 to 40 mass %.

The temperature during the hydrothermal reaction in the step (II-1) may be 100° C. or higher, more preferably 130 to 180° C. It is preferable that the hydrothermal reaction be conducted in a pressure resistant container. In the case where the reaction is conducted at 130 to 180° C., it is preferable that the pressure during the reaction be 0.3 to 0.9 MPa, and in the case where the reaction is conducted at 140 to 160° C., it is preferable that the pressure during the reaction be 0.3 to 0.6 MPa. It is preferable that the time for the hydrothermal reaction be 0.1 to 48 hours, more preferably 0.2 to 24 hours.

The obtained composite (Y-1) is the composite comprising the compound represented by the formulas (A) to (C) and the cellulose nanofiber, and a composite particle (primary particle) comprising the cellulose nanofiber can be isolated from the composite (Y-1) through washing with water after filtration, and drying thereafter. It is to be noted that as drying means, freeze drying and vacuum drying are used.

The BET specific surface area of the composite (Y-1) obtained is preferably 5 to 40 $m^2/g$, more preferably 5 to 20 $m^2/g$ from the viewpoint of reducing the amount of the adsorbed water effectively. When the BET specific surface area of the composite (Y-1) is less than 5 $m^2/g$, there is a risk that the primary particle of the positive electrode active substance for a secondary cell becomes too large and the cell properties are lowered. When the BET specific surface area exceeds 40 $m^2/g$, there is a risk that the amount of the adsorbed water in the positive electrode active substance for a secondary cell increases to give an influence on the cell properties.

The positive electrode active substance (P-1) for a secondary cell according to the present invention is an active substance wherein 0.3 to 5 mass % of the graphite is supported on the composite comprising: the compound represented by the formulas (A) to (C); and the carbon obtained by carbonizing the cellulose nanofiber, and specifically, it is preferable to obtain the positive electrode active substance (P-1) for a secondary cell by a production method comprising: a step of adding the graphite to the composite particle (primary particle) comprising the compound represented by the formulas (A) to (C) and the cellulose nanofiber; obtaining the composite (Y-1) comprising the compound and the cellulose nanofiber through the step (I-1) and the step (II-1); subsequently, a step (III-1) of adding the graphite to the obtained composite (Y-1) to conduct mixing while applying compressive force and shear force, thereby obtaining a composite (Z-1); and a step (IV-1) of pyrolyzing the obtained composite (Z-1) in a reducing atmosphere or an inert atmosphere. In this way, by conducting mixing treatment while applying the compressive force and the shear force, the composite (Y-1) and the graphite are uniformly dispersed and the graphite is aggregated firmly while being deformed or extended, so that the BET specific surface area is reduced effectively, and the graphite together with the cellulose nanofiber to be carbonized in the following pyrolyzing step can form as a particle a positive electrode active substance for a secondary cell, to which the adsorption of water can be suppressed effectively.

The step (III-1) is a step for adding the graphite as a carbon source other than the cellulose nanofiber to the composite (Y-1) (composite comprising compound represented by formulas (A) to (C) and cellulose nanofiber) and is specifically a step of adding the graphite to the composite (Y-1) obtained through the step (I-1) and the step (II-1) to conduct mixing while applying the compressive force and the shear force, thereby obtaining the composite (Z-1).

The amount of the graphite added is preferably 0.3 to 5 mass %, more preferably 0.5 to 4 mass %, and still more preferably 0.6 to 3 mass % in the positive electrode active substance for a secondary cell according to the present invention.

The composite (Y-1) and the graphite are preferably mixed so that the mass ratio (composite (Y-1):graphite) may be 99:1 to 91:9, more preferably 98:2 to 93:7 from the viewpoint of efficiently and uniformly covering the surface of the compound represented by the formulas (A) to (C) with the graphite and effectively reducing, by the graphite together with the cellulose nanofiber, the amount of the adsorbed water in the positive electrode active substance for a secondary cell to be obtained.

The mixing treatment which is conducted while the compressive force and the shear force are applied is preferably conducted for 5 to 90 minutes, more preferably 10 to 80 minutes. It is preferable to conduct the treatment in an airtight container provided with an impeller rotating at a circumferential speed of 25 to 40 m/s. The circumferential speed of the impeller is preferably 27 to 40 m/s from the viewpoint of enhancing the tap density of the positive electrode active substance to be obtained and reducing the BET specific surface area to reduce the amount of the adsorbed water effectively.

It is to be noted that the circumferential speed of the impeller means the speed of the outermost edge portion of a rotary type stirring blade (impeller) and can be expressed by the following formula (1), and the time for conducting the mixing treatment while applying the compressive force and the shear force becomes longer as the circumferential speed of the impeller becomes slower and therefore can be varied depending on the circumferential speed of the impeller.

$$\text{Circumferential speed of impeller (m/s)} = \text{Radius of impeller (m)} \times 2 \times \pi \times \text{number of revolution (rpm)} \div 60 \quad (1)$$

The treatment time and/or the circumferential speed of the impeller in the step (III-1) need to be adjusted appropriately according to the amount of the composite Y-1 and the graphite which are put into the container. By operating the container, the treatment of mixing the mixture of the composite Y-1 and the graphite can be conducted while the compressive force and the shear force are applied to the mixture between the impeller and the inner wall of the container, so that the composite particle which is the positive electrode active substance for a secondary cell, in which the graphite is densely and uniformly dispersed and the amount of the adsorbed water can be reduced effectively by the graphite obtained by carbonizing the cellulose nanofiber, can be formed at the surface of the primary particle or in the gap between the particles.

For example, in the case where the mixing treatment is conducted in an airtight container provided with an impeller rotating at a circumferential speed of 25 to 40 m/s for 5 to 90 minutes, the total amount of the amount of the composite (Y-1) put into the container and the amount of the graphite added is preferably 0.1 to 0.7 g, more preferably 0.15 to 0.4 g per 1 $cm^3$ of the effective container (in the container provided with the impeller, a container corresponding to a site where the composite (Y-1) and the graphite can be accommodated).

It is to be noted that the composite (Y-1) and the graphite may be mixed in advance before these are put into the airtight container provided with the impeller from the viewpoint of enhancing the uniformity of the positive electrode active substance for a secondary cell to be obtained and from the viewpoint of making the treatment of mixing the composite (Y-1) and the graphite efficient.

Examples of an apparatus provided with the airtight container in which the mixing treatment can be conducted while the compressive force and the shear force are applied include a high-speed shearing mill and a blade type kneader, and specifically, for example, a particle composing machine, Nobilta (manufactured by Hosokawa Micron Corporation), can be used suitably. By using the apparatus, the mixing treatment can be conducted easily while predetermined compressive force and shear force are applied, and the positive electrode active substance (P-1) for a secondary cell according to the present invention can be obtained by only applying the treatment.

With respect to the mixing treatment conditions, the treatment temperature is preferably 5 to 80° C., more preferably 10 to 50° C. The treatment atmosphere is not particularly limited; however, the treatment is preferably conducted under an inert gas atmosphere or a reducing gas atmosphere.

The step (IV-1) is a step of pyrolyzing the composite (Z-1) obtained through the step (III-1) in a reducing atmosphere or an inert gas atmosphere. Through the step (IV-1), the carbon obtained by carbonizing the cellulose nanofiber is supported firmly on the surface of the compound represented by the formulas (A) to (C) and the graphite added to the composite (Y-1) also exists as carbon which covers the surface of the compound represented by the formulas (A) to (C). Further, the crystallinity of both the compound and the graphite which has been lowered due to the application of the compressive force and the shear force can be recovered by the pyrolysis, and therefore the electrical conductivity of the positive electrode active substance to be obtained can be enhanced effectively.

The pyrolysis temperature is preferably 500 to 800° C., more preferably 600 to 770° C., and still more preferably 650 to 750° C. from the viewpoint of carbonizing the cellulose nanofiber effectively. In addition, the pyrolysis time is preferably 10 minutes to 3 hours, more preferably 30 minutes to 1.5 hours.

In the positive electrode active substance (P-1) for a secondary cell according to the present invention obtained in this way, the mass ratio of the amount of the graphite added and the amount of the carbon derived from the cellulose nanofiber (graphite/cellulose nanofiber) is preferably 0.08 to 6, more preferably 0.1 to 4, and still more preferably 1 to 3. By the mass ratio being in the range, the carbon which is supported on or covers the surface of the compound represented by the formulas (A) to (C) and which is derived from the cellulose nanofiber and the graphite act synergistically, so that the amount of the adsorbed water in the positive electrode active substance (P-1) for a secondary cell can be reduced effectively.

In the case where the positive electrode active substance for a secondary cell according to the present invention is the positive electrode active substance (P-2a) for a secondary cell, wherein 0.1 to 4 mass % of the carbon obtained by carbonizing the water-soluble carbon material is supported on the composite comprising: the compound; and the carbon obtained by carbonizing the cellulose nanofiber, the positive electrode active substance (P-2a) for a secondary cell is the positive electrode active substance for a secondary cell, wherein 0.1 to 4 mass % of the carbon derived from the water-soluble carbon material is supported on the composite comprising: the compound represented by the formula (A), (B), or (C); and the carbon derived from the cellulose nanofiber. That is, the positive electrode active substance (P-2a) for a secondary cell is obtained by using the cellulose nanofiber and a particular amount of the water-soluble carbon material as carbon sources, and in the composite wherein the cellulose nanofiber becomes the carbon obtained by carbonizing the cellulose nanofiber to cover the surface of the compound, the carbonized water-soluble carbon material is supported effectively at a site where the carbon derived from the cellulose nanofiber does not exist and the surface of the compound is exposed. Accordingly, after both the cellulose nanofiber and the water-soluble carbon material are carbonized, the cellulose nanofiber and the water-soluble carbon material are supported firmly over the whole surface of the compound while the exposure of the surface of the compound is suppressed effectively, so that the adsorption of water in the positive electrode active substance for a secondary cell according to the present invention can be prevented effectively.

In the case where the positive electrode active substance for a secondary cell according to the present invention is the positive electrode active substance (P-2b) for a secondary cell, wherein 0.1 to 5 mass % of the metal fluoride is supported on the composite comprising: the compound; and the carbon obtained by carbonizing the cellulose nanofiber, the positive electrode active substance (P-2b) for a secondary cell is the positive electrode active substance for a secondary cell, wherein 0.1 to 5 mass % of the metal fluoride is supported on the composite comprising: the compound represented by the formula (A), (B), or (C); and the carbon obtained by carbonizing the cellulose nanofiber. That is, the positive electrode active substance (P-2b) for a secondary cell is obtained by using the cellulose nanofiber as a carbon source and using a particular amount of the metal fluoride to supplement the cellulose nanofiber, and in the composite wherein the cellulose nanofiber becomes the carbon obtained by carbonizing the cellulose nanofiber to cover the surface of the compound, the metal fluoride is supported effectively at the site where the carbon derived from the cellulose nanofiber does not exist and the surface of the compound is exposed. Accordingly, the carbon derived from the cellulose nanofiber together with the metal fluoride is supported firmly over the whole surface of the compound while the exposure of the surface of the oxide is suppressed, so that the adsorption of water in the positive electrode active substance for a secondary cell according to the present invention can be prevented effectively.

Specifically, the composite (primary particle) comprising the compound and the cellulose nanofiber in the positive electrode active substances (P-2a) and (P-2b) for a secondary cell is preferably obtained by subjecting the slurry comprising: the lithium compound or the sodium compound; the phosphoric acid compound or the silicic acid compound; at least the iron compound or the manganese compound; and the cellulose nanofiber to hydrothermal reaction in the same manner as the composite (primary particle) comprising the compound and the cellulose nanofiber in the case of the positive electrode active substance (P-1) for a secondary cell. That is, the composite is preferably a hydrothermal reaction product of the slurry comprising: the lithium compound or the sodium compound; the phosphoric acid compound or the silicic acid compound; at least the iron compound or the manganese compound; and the cellulose nanofiber.

The water-soluble carbon material to be supported as the carbon obtained through carbonization on the composite in the positive electrode active substance (P-2a) for a secondary cell means a carbon material which dissolves in 100 g of water at 25° C. in an amount of 0.4 g or more, preferably 1.0 g or more expressed in terms of carbon atoms of the water-soluble carbon material and functions as a carbon source to be supported on the compound represented by the formulas (A) to (C). Examples of the water-soluble carbon material include at least one selected from the group consisting of saccharides, polyols, polyethers, and organic acids. More specific examples include: monosaccharides such as glucose, fructose, galactose, and mannose; disaccharides such as maltose, sucrose, and cellobiose; polysaccharides such as starches and dextrins; polyols and polyethers such as ethylene glycol, propylene glycol, diethylene glycol, polyethylene glycol, butane diol, propane diol, polyvinyl alcohol, and glycerin; and organic acids such as citric acid, tartaric acid, and ascorbic acid. Among the water-soluble carbon materials, glucose, fructose, sucrose, and dextrins are preferable, more preferably glucose from the viewpoint of high solubility and dispersibility to solvents for functioning as a carbon material effectively.

The water-soluble carbon material is preferably supported on the composite as carbon obtained by subjecting the water-soluble carbon material and the composite to wet mixing and then carbonizing the resulting mixture from the viewpoint of allowing the water-soluble carbon material to be supported as the carbon derived from the water-soluble carbon material in an amount of 0.1 to 4 mass % effectively at the site where the carbon derived from the cellulose nanofiber does not exist and the surface of the compound is exposed in the composite, that is, the positive electrode active substance for a secondary cell according to the present invention is preferably the positive electrode active substance for a secondary cell, wherein the carbon obtained by carbonizing the water-soluble carbon material is supported on the composite comprising: the compound; and the carbon obtained by carbonizing the cellulose nanofiber. The amount of the carbon supported for the carbon derived from the water-soluble carbon material is preferably 0.1 to 4 mass %, more preferably 0.2 to 3.5 mass %, and still more preferably 0.3 to 3 mass % in the positive electrode active substance for a secondary cell according to the present invention from the viewpoint of allowing the water-soluble carbon material to be supported effectively on the surface of the compound where the carbon obtained by carbonizing the cellulose nanofiber does not exist.

Examples of the metal in the metal fluoride to be supported on the composite in the positive electrode active substance (P-2b) for a secondary cell include lithium (Li), sodium (Na), magnesium (Mg), calcium (Ca), aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), tantalum (Ta), tin (Sn), tungsten (W), potassium (K), barium (Ba), and strontium (Sr). Among the metals, the metal is preferably selected from the group consisting of lithium, sodium, magnesium, calcium, and aluminum, more preferably selected from the group consisting of lithium and magnesium from the viewpoint of improving the hydrophobicity of the metal fluoride and improving the ionic conductivity.

The metal fluoride is preferably supported on the composite by using a precursor of the metal fluoride for forming the metal fluoride and subjecting the composite and the precursor of the metal fluoride to wet mixing from the viewpoint of allowing the metal fluoride to be supported in an amount of 0.1 to 5 mass % effectively at the site where the carbon obtained by carbonizing the cellulose nanofiber does not exist and the surface of the compound is exposed in the composite. Specifically, the composite and the precursor of the metal fluoride are thereafter pyrolyzed and the precursor of the metal fluoride is supported as the metal fluoride and exists in the positive electrode active substance for a secondary cell according to the present invention. That is, the positive electrode active substance for a secondary cell according to the present invention is preferably a pyrolyzed product of a mixture obtained by wet-mixing the composite comprising: the compound; and the cellulose nanofiber with the precursor of the metal fluoride.

The amount of the metal fluoride supported is 0.1 to 5 mass %, preferably 0.2 to 4.5 mass %, and more preferably 0.3 to 4 mass % in the positive electrode active substance for a secondary cell according to the present invention from the viewpoint of allowing the metal fluoride to be supported effectively on the surface of the compound where the carbon derived from the cellulose nanofiber does not exist. When the amount of the metal fluoride supported is less than 0.1 mass %, the amount of the adsorbed water cannot be suppressed sufficiently, and when the amount of the metal fluoride supported exceeds 5 mass %, there is a risk that the cycle properties of the secondary cell is lowered even though the amount of the adsorbed water is suppressed, although the details are not clear. The amount of fluorine existing in the positive electrode active substance for a secondary cell can be checked with an ion analyzer using a solution obtained by dissolving the electrode active substance for a secondary cell with an acid.

More specifically, the positive electrode active substance (P-2a) or (P-2b) for a secondary cell according to the present invention is preferably obtained by a production method comprising:

a step (I-2) of mixing the phosphoric acid compound or the silicic acid compound with a mixture (X-2) comprising: the lithium compound or the sodium compound; and the cellulose nanofiber, thereby obtaining a composite (X-2);

a step (II-2) of subjecting slurry (Y-2) comprising: the obtained composite (X-2); and the metal salt comprising at least the iron compound or the manganese compound to hydrothermal reaction, thereby obtaining a composite (Y-2) (primary particle); and a step (III-2) of adding 0.1 to 16 mass parts of a water-soluble organic compound to the obtained composite (Y-2) based on 100 mass parts of the composite (Y-2) or adding 0.1 to 40 mass parts of the precursor of the metal fluoride to the obtained composite (Y-2) based on 100 mass parts of the composite (Y-2) and conducting wet mixing and then pyrolyzing.

The steps (I-2) and (II-2) are similar to the steps (I-1) and (II-1) in the method for producing the positive electrode active substance (P-1) for a secondary cell, and through these steps, the composite (Y-2) (primary particle) which comprises the compound represented by the formulas (A) to (C) and the cellulose nanofiber and which is the same as the composite (Y-1) (primary particle) can be obtained.

The method for producing the positive electrode active substance (P-2a) for a secondary cell according to the present invention comprises the step (III-2a) of adding 0.1 to 16 mass parts of the water-soluble organic compound to the composite (Y-2) obtained through the steps (I-2) and (II-2) based on 100 mass parts of the composite and conducting wet mixing and then pyrolyzing. Through the step (III-2a), the exposure of the surface of the compound represented by the formulas (A) to (C) is suppressed effectively, and the cellulose nanofiber and the water-soluble carbon material, which are carbon sources, can be supported as carbon obtained by carbonizing both the cellulose nanofiber and the water-soluble carbon material on the compound firmly.

The amount of the water-soluble carbon material added may be such that the amount of the water-soluble carbon material supported as carbon obtained through carbonization falls within the range expressed in terms of carbon atoms as described above and is, for example, 0.1 to 16 mass parts, preferably 0.2 to 14 mass parts, and more preferably 0.3 to 12 mass parts based on 100 mass parts of the composite (Y-2) from the viewpoint of allowing the carbon obtained by carbonizing the water-soluble carbon material to be supported in an amount of 0.1 to 4 mass % effectively on the surface of the compound where the carbon derived from the cellulose nanofiber does not exist. In addition, it is preferable to add water with the water-soluble carbon material. The amount of water added is preferably 30 to 300 mass parts, more preferably 50 to 250 mass parts, and still more preferably 75 to 200 mass parts based on 100 mass parts of the composite (Y-2).

The wet mixing means in the step (III-2) is not particularly limited, and the wet mixing can be conducted by an ordinary method. The temperature during the mixing after adding the water-soluble carbon material in the amount as described above to the composite (Y-2) is preferably 5 to 80° C., more preferably 10 to 60° C. It is preferable to dry the obtained mixture before pyrolyzing. Examples of the drying means include spray drying, vacuum drying and freeze drying.

In the step (III-2a), the mixture obtained through the wet mixing is pyrolyzed. It is preferable to conduct pyrolyzing in a reducing atmosphere or an inert atmosphere. The pyrolysis temperature is preferably 500 to 800° C., more preferably 600 to 770° C., and still more preferably 650 to 750° C. from the viewpoint of carbonizing the cellulose nanofiber effectively. In addition, the pyrolysis time is preferably 10 minutes to 3 hours, more preferably 30 minutes to 1.5 hours.

The method for producing the positive electrode active substance (P-2b) for a secondary cell according to the present invention comprises the step (III-2b) of adding 0.1 to 40 mass parts of the precursor of the metal fluoride to the composite (Y-2) obtained through the steps (I-2) and (II-2) based on 100 mass parts of the composite (Y-2) and conducting wet mixing and then pyrolyzing. Through the step (III-2b), the exposure of the surface of the compound represented by the formulas (A) to (C) is suppressed effectively, and the carbon derived from the cellulose nanofiber and the metal fluoride formed from the precursor of the metal fluoride through pyrolyzing can be supported on the compound firmly.

The amount of the precursor of the metal fluoride added may be an amount which falls within the range expressed in terms of the amount of the metal fluoride supported in the positive electrode active substance for a secondary cell to be obtained as described above and is, for example, 0.1 to 40 mass parts, preferably 0.2 to 36 mass parts, and more preferably 0.3 to 32 mass parts based on 100 mass parts of the composite (Y-2) from the viewpoint of allowing the metal fluoride to be supported in an amount of 0.1 to 5 mass % effectively on the surface of the compound where the carbon derived from the cellulose nanofiber does not exist. In addition, it is preferable to add water with the precursor of the metal fluoride from the viewpoint of allowing the metal fluoride to be supported effectively. The amount of water added is preferably 30 to 300 mass parts, more preferably 50 to 250 mass parts, and still more preferably 75 to 200 mass parts based on 100 mass parts of the composite (Y-2).

The precursor of the metal fluoride may be a compound which can form the metal fluoride to be supported on the compound by being pyrolyzed later. Specifically, as the precursor of the metal fluoride, it is preferable to use a fluorine compound and a metal compound, which are other than the metal fluoride, together. Examples of the fluorine compound other than the metal fluoride include hydrofluoric acid, ammonium fluoride, and hypofluorous acid, and among the fluorine compounds, it is preferable to use ammonium fluoride. Examples of the metal compound other than the metal fluoride include metal acetates, metal nitrates, metal lactates, metal oxalates, metal hydroxides, metal ethoxides, metal isopropoxides, and metal butoxides, and among the metal compounds, the metal hydroxides are preferable.

It is to be noted that the metal of the metal compound has the same definition as the metal of the metal fluoride.

The wet mixing means and the pyrolysis conditions in the step (III-2b) are the same as those in the step (III-2a) in the method for producing the positive electrode active substance (P-2a) for a secondary cell.

In the positive electrode active substance for a secondary cell, wherein the compound is represented by the formula (A) or (C), the amount of the absorbed water in the positive electrode active substance for a secondary cell according to the present invention is preferably 1,200 ppm or less, more preferably 1,000 ppm or less, and in the positive electrode active substance for a secondary cell, wherein the compound is represented by the formula (B), the amount is preferably 2,500 ppm or less, more preferably 2,000 ppm or less. It is to be noted that the amount of the adsorbed water is a value measured as the amount of water volatilized between a start point and an end point, wherein when water is adsorbed at a temperature of 20° C. and a relative humidity of 50% until an equilibrium is achieved, the temperature is then raised to 150° C. where the temperature is kept for 20 minutes, and the temperature is then further raised to 250° C. where the temperature is kept for 20 minutes, the start point is defined as the time when raising the temperature is restarted from 150° C., and the end point is defined as the time when the state of the constant temperature at 250° C. is completed. The amount of the adsorbed water in the positive electrode active substance for a secondary cell and the amount of the water volatilized between the start point and the end point are regarded as the same amount, and the measured value of the amount of the water volatilized is defined as the amount of the adsorbed water in the positive electrode active substance for a secondary cell.

As described above, the positive electrode active substance for a secondary cell according to the present invention is hard to adsorb water, and therefore the amount of the adsorbed water can be reduced effectively without a strong drying condition as a production environment and excellent cell properties can be exhibited stably even under the various use environments in both the lithium secondary cell and the sodium secondary cell to be obtained.

It is to be noted that the amount of the water volatilized between the start point and the end point, wherein when water is adsorbed at a temperature of 20° C. and a relative humidity of 50% until an equilibrium is achieved, the temperature is then raised to 150° C. where the temperature is kept for 20 minutes, and the temperature is then further raised to 250° C. where the temperature is kept for 20 minutes, the start point is defined as the time when raising the temperature is restarted from 150° C., and the end point is defined as the time when the state of the constant temperature at 250° C. is completed, can be measured, for example, using a Karl Fischer moisture titrator.

In addition, the tap density of the positive electrode active substance for a secondary cell according to the present invention is preferably 0.5 to 1.6 g/cm$^3$, more preferably 0.8 to 1.6 g/cm$^3$ from the viewpoint of reducing the amount of the adsorbed water effectively.

Further, the BET specific surface area of the positive electrode active substance for a secondary cell according to the present invention is preferably 5 to 21 m$^2$/g, more preferably 7 to 20 m$^2$/g from the viewpoint of reducing the amount of the adsorbed water effectively.

The secondary cell to which a positive electrode for a secondary cell, the positive electrode comprising the positive electrode active substance for a secondary cell according to the present invention, is applicable is not particularly limited as long as the secondary cell comprises a positive electrode, a negative electrode, an electrolytic solution, and a separator as essential constituents.

The negative electrode here is not particularly limited by the material constitution thereof as long as the negative electrode can occlude lithium ions or sodium ions during charge and release lithium ions or sodium ions during discharge, and negative electrodes having publicly known material constitution can be used. Examples of the material include lithium metal, sodium metal, and a carbon material such as graphite or amorphous carbon. It is preferable to use an electrode, or a carbon material in particular, which is formed from an intercalation material that can electrochemically occlude•release lithium ions or sodium ions.

The electrolytic solution is obtained by dissolving a supporting electrolyte in an organic solvent. The organic solvent is not particularly limited as long as the organic solvent is usually used in an electrolytic solution for a lithium ion secondary cell or a sodium ion secondary cell, and for example, carbonates, halogenated hydrocarbons, ethers, ketones, nitriles, lactones, and oxolane compounds can be used.

The kind of the supporting electrolyte is not particularly limited; however, in the case of lithium ion secondary cells, at least one of inorganic salts selected from the group consisting of LiPF$_6$, LiBF$_4$, LiClO$_4$, and LiAsF$_6$ and derivatives of the inorganic salts; and organic salts selected from the group consisting of LiSO$_3$CF$_3$, LiC(SO$_3$CF$_3$)$_2$, LiN(SO$_3$CF$_3$)$_2$, LiN(SO$_2$C$_2$F$_5$)$_2$, and LiN(SO$_2$CF$_3$)(SO$_2$C$_4$F$_9$) and derivatives of the organic salts is preferable. In addition, in the case of sodium ion secondary cells, at least one of inorganic salts selected from the group consisting of NaPF$_6$, NaBF$_4$, NaClO$_4$, and NaAsF$_6$ and derivatives of the inorganic salts; and organic salts selected from the group consisting of NaSO$_3$CF$_3$, NaC(SO$_3$CF$_3$)$_2$, NaN(SO$_3$CF$_3$)$_2$, NaN(SO$_2$C$_2$F$_5$)$_2$, and NaN(SO$_2$CF$_3$)(SO$_2$C$_4$F$_9$) and derivatives of the organic salts is preferable.

The separator plays a roll of electrically insulating the positive electrode and the negative electrode and holding the electrolytic solution. For example, a porous synthetic resin membrane, a porous membrane of a polyolefin-based polymer (polyethylene, polypropylene) in particular, may be used.

EXAMPLES

Hereinafter, the present invention will be described specifically based on Examples; however, the present invention is not limited to the Examples.

Example 1-1

Slurry was obtained by mixing 12.72 g of LiOH.H$_2$O, 90 mL of water, and 5.10 g of a cellulose nanofiber (CELISH KY-100G, manufactured by Daicel FineChem Ltd., fiber diameter of 4 to 100 nm, CNF for short). Subsequently, 11.53 g of an 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours under a nitrogen gas purge to obtain slurry ($X^{11}$-1) (dissolved oxygen concentration of 0.5 mg/L) comprising a composite ($X^{11}$-1). The slurry ($X^{11}$-1) comprised 2.97 mol of lithium based on 1 mol of phosphorus.

Subsequently, 4.17 g of $FeSO_4 \cdot 7H_2O$ and 19.29 g of $MnSO_4 \cdot 5H_2O$ were added to 119.4 g of the obtained slurry ($X^{11}$-1), and the resultant mixture was mixed to obtain slurry ($Y^{11}$-1). Subsequently, the obtained slurry ($Y^{11}$-1) was put into an autoclave purged with a nitrogen gas to conduct hydrothermal reaction at 170° C. for 1 hour. The pressure in the autoclave was 0.8 MPa. A produced crystal was filtered and then washed with 12 mass parts of water based on 1 mass part of the crystal. The washed crystal was freeze-dried at −50° C. for 12 hours to obtain a composite ($Y^{11}$-1) (chemical composition of compound represented by formula (A): $LiFe_{0.2}Mn_{0.8}PO_4$, BET specific surface area of 21 m$^2$/g, average particle diameter of 60 nm, amount of carbon derived from CNF of 1.5 mass %).

A mixture ($Y^{11}$-1) was obtained by mixing 98.0 g of the obtained composite ($Y^{11}$-1) and 2.0 g (corresponding to 2.0 mass % expressed in terms of carbon atoms in active substance) of graphite (high-purity graphite powder, manufactured by Nippon Graphite Industries, Co., Ltd., BET specific surface area of 5 m$^2$/g, average particle diameter of 6.1 μm) in advance. The obtained mixture ($Y^{11}$-1) was put into a particle composing machine, Nobilta (NOB-130, manufactured by Hosokawa Micron Corporation, output of 5.5 kw) and was mixed under the condition of the treatment temperature at 25 to 35° C., the circumferential speed of the impeller at 30 m/s, and the treatment time for 15 minutes to obtain a preliminary particle ($Y^{11}$-1) for a composite.

Subsequently, the obtained preliminary particle ($Y^{11}$-1) for a composite was pyrolyzed at a temperature of 750° C. for 90 minutes using an electric furnace purged with a nitrogen gas to obtain a positive electrode active substance ($LiFe_{0.2}Mn_{0.8}PO_4$, amount of carbon=3.5 mass %) for a lithium ion secondary cell as a composite ($Z^{11}$-1).

Example 1-2

Slurry ($X^{12}$-1) was obtained in the same manner as the slurry ($X^{11}$-1) obtained in Example 1-1 except that the amount of the CNF was changed to 1.70 g, and a composite ($Y^{12}$-1) (BET specific surface area of 22 m$^2$/g, average particle diameter of 58 nm, amount of carbon derived from CNF of 0.5 mass %) was then obtained in the same manner as the composite ($Y^{11}$-1) obtained in Example 1-1. Subsequently, a positive electrode active substance ($LiFe_{0.2}Mn_{0.8}PO_4$, amount of carbon=2.5 mass %) for a lithium ion secondary cell was obtained using the obtained composite ($Y^{12}$-1) in the same manner as in Example 1-1 except that 98.0 g of the composite ($Y^{12}$-1) and 2.0 g (corresponding to 2.0 mass % expressed in terms of carbon atoms in active substance) of the graphite were mixed.

Example 1-3

Slurry ($X^{13}$-1) was obtained in the same manner as the slurry ($X^{11}$-1) obtained in Example 1-1 except that the amount of the CNF was changed to 3.40 g, and a composite ($Y^{13}$-1) (BET specific surface area of 21 m$^2$/g, average particle diameter of 55 nm, amount of carbon derived from CNF of 1.0 mass %) was then obtained in the same manner as the composite ($Y^{11}$-1) obtained in Example 1-1. Subsequently, a positive electrode active substance ($LiFe_{0.2}Mn_{0.8}PO_4$, amount of carbon=3.0 mass %) for a lithium ion secondary cell was obtained using the obtained composite ($Y^{13}$-1) in the same manner as in Example 1-1 except that 98.0 g of the composite ($Y^{13}$-1) and 2.0 g (corresponding to 2.0 mass % expressed in terms of carbon atoms in active substance) of the graphite were mixed.

Example 1-4

A positive electrode active substance ($LiFe_{0.2}Mn_{0.8}PO_4$, amount of carbon=3.5 mass %) for a lithium ion secondary cell was obtained using the composite ($Y^{11}$-1) obtained in Example 1-1 in the same manner as in Example 1-1 except that 98.0 g of the composite ($Y^{11}$-1) and 2.0 g (corresponding to 2.0 mass % expressed in terms of carbon atoms in active substance) of flake graphite (manufactured by Ito Graphite Co., Ltd., BET specific surface area of 13.2 m$^2$/g, average particle diameter of 8.6 μm) were mixed.

Example 1-5

A positive electrode active substance ($LiFe_{0.2}Mn_{0.8}PO_4$, amount of carbon=2.0 mass %) for a lithium ion secondary cell was obtained using the composite ($Y^{11}$-1) obtained in Example 1-1 in the same manner as in Example 1-1 except that 99.5 g of the composite ($Y^{11}$-1) and 0.5 g (corresponding to 0.5 mass % expressed in terms of carbon atoms in active substance) of the graphite were mixed.

Example 1-6

A positive electrode active substance ($LiFe_{0.2}Mn_{0.8}PO_4$, amount of carbon=4.5 mass %) for a lithium ion secondary cell was obtained using the composite ($Y^{11}$-1) obtained in Example 1-1 in the same manner as in Example 1-1 except that 97.0 g of the composite ($Y^{11}$-1) and 3.0 g (corresponding to 3.0 mass % expressed in terms of carbon atoms in active substance) of the graphite were mixed.

Example 1-7

A composite ($Y^{17}$-1) (chemical composition of compound represented by formula (A): $LiFe_{0.18}Mn_{0.80}Mg_{0.02}PO_4$, BET specific surface area of 21 m$^2$/g, average particle diameter of 56 nm) was obtained using the slurry ($X^{11}$-1) obtained in Example 1-1 in the same manner as in Example 1-1 except that 0.50 g of $MgSO_4 \cdot 7H_2O$ was added to the slurry ($X^{11}$-1) in addition to 5.00 g of $FeSO_4 \cdot 7H_2O$ and 19.29 g of $MnSO_4 \cdot 5H_2O$.

Subsequently, a positive electrode active substance ($LiFe_{0.18}Mn_{0.80}Mg_{0.02}PO_4$, amount of carbon=3.5 mass %) for a lithium ion secondary cell was obtained using the obtained composite ($Y^{17}$-1) in the same manner as in Example 1-1 except that 98.0 g of the composite ($Y^{17}$-1) and 2.0 g (corresponding to 2.0 mass % expressed in terms of carbon atoms in active substance) of the graphite were mixed.

Example 1-8

A composite ($Y^{18}$-1) (chemical composition of compound represented by formula (A): $LiFe_{0.18}Mn_{0.80}Zr_{0.01}PO_4$, BET specific surface area of 21 m$^2$/g, average particle diameter of 60 nm, amount of carbon derived from CNF of 1.5 mass %) was obtained using the slurry ($X^{11}$-1) obtained in Example 1-1 in the same manner as in Example 1-1 except that 0.36 g of $Zr(SO_4)_2 \cdot 4H_2O$ was added to the slurry ($X^{11}$-1) in addition to 5.00 g of $FeSO_4 \cdot 7H_2O$ and 19.29 g of $MnSO_4 \cdot 5H_2O$.

Subsequently, a positive electrode active substance (LiFe$_{0.18}$Mn$_{0.80}$Zr$_{0.01}$PO$_4$, amount of carbon=3.5 mass %) for a lithium ion secondary cell was obtained using the obtained composite (Y$^{18}$-1) in the same manner as in Example 1-1 except that 98.0 g of the composite (Y$^{18}$-1) and 2.0 g (corresponding to 2.0 mass % expressed in terms of carbon atoms in active substance) of the graphite were mixed.

Comparative Example 1-1

A positive electrode active substance (LiFe$_{0.2}$Mn$_{0.8}$PO$_4$, amount of carbon=1.5 mass %) for a lithium ion secondary cell was obtained using the composite (Y$^{11}$-1) obtained in Example 1-1 in the same manner as in Example 1-1 except that the carbon source, such as graphite, other than the cellulose nanofiber was not added to the composite (Y$^{11}$-1).

Comparative Example 1-2

A positive electrode active substance (LiFe$_{0.2}$Mn$_{0.8}$PO$_4$, amount of carbon=3.5 mass %) for a lithium ion secondary cell was obtained using the composite (Y$^{11}$-1) obtained in Example 1-1 in the same manner as in Example 1-1 except that 98.0 g of the composite (Y$^{11}$-1) and 2.0 g (corresponding to 2.0 mass % expressed in terms of carbon atoms in active substance) of Ketjen black (manufactured by Lion Corporation, BET specific surface area of 800 m$^2$/g, average particle diameter of 30.0 μm) were mixed.

Comparative Example 1-3

Slurry (Xc$^{13}$-1) was obtained in the same manner as the slurry (X$^{11}$-1) obtained in Example 1-1 except that the CNF was not used, and a composite (Y$^{c13}$-1) (chemical composition of compound represented by formula (A): LiFe$_{0.2}$Mn$_{0.8}$PO$_4$, BET specific surface area of 21 m$^2$/g, average particle diameter of 60 nm, amount of carbon derived from CNF of 0.0 mass %) was then obtained in the same manner as the composite (Y$^{11}$-1) obtained in Example 1-1. Subsequently, a positive electrode active substance (LiFe$_{0.2}$Mn$_{0.8}$PO$_4$, amount of carbon=2.0 mass %) for a lithium ion secondary cell was obtained using the obtained primary particle (Y$^{c13}$-1) in the same manner as in Example 1-1 except that 98.0 g of the composite (Y$^{c13}$-1) and 2.0 g (corresponding to 2.0 mass % expressed in terms of carbon atoms in active substance) of the graphite were mixed.

Comparative Example 1-4

A composite (Y$^{14}$-1) (chemical composition of compound represented by formula (A): LiFePO$_4$, BET specific surface area of 19 m$^2$/g, average particle diameter of 85 nm, amount of carbon derived from CNF of 1.5 mass %) was obtained using the slurry (X$^{11}$-1) obtained in Example 1-1 in the same manner as in Example 1-1 except that 27.80 g of FeSO$_4$.7H$_2$O was only added to the slurry (X$^{11}$-1).

Subsequently, a positive electrode active substance (LiFePO$_4$, amount of carbon=3.5 mass %) for a lithium ion secondary cell was obtained using the obtained composite (Y$^{14}$-1) in the same manner as in Example 1-1 except that 98.0 g of the composite (Y$^{14}$-1) and 2.0 g (corresponding to 2.0 mass % expressed in terms of carbon atoms in active substance) of the Ketjen black were mixed.

Example 2-1

Slurry (X$^{21}$-1) was obtained by mixing 3.75 L of ultrapure water with 0.428 kg of LiOH.H$_2$O and 1.40 kg of Na$_4$SiO$_4$.nH$_2$O. Subsequently, the nitrogen gas purge was conducted to the obtained slurry (X$^{21}$-1) to adjust the dissolved oxygen concentration to 0.5 mg/L, 1.49 kg of the CNF, 0.39 kg of FeSO$_4$.7H$_2$O, 0.79 kg of MnSO$_4$.5H$_2$O, and 0.053 kg of Zr(SO$_4$)$_2$.4H$_2$O were then added to the slurry (X$^{21}$-1), and the resultant mixture was mixed to obtain slurry (Y$^{21}$-1). Subsequently, the obtained slurry (Y$^{21}$-1) was put into the autoclave purged with a nitrogen gas to conduct hydrothermal reaction at 150° C. for 12 hours. The pressure in the autoclave was 0.4 MPa. A produced crystal was filtered and then washed with 12 mass parts of water based on 1 mass part of the crystal. The washed crystal was freeze-dried at −50° C. for 12 hours to obtain a composite (Y$^{21}$-1) (powder, chemical composition represented by formula (B): Li$_2$Fe$_{0.28}$Mn$_{0.66}$Zr$_{0.03}$SiO$_4$, amount of carbon derived from CNF of 7.0 mass %).

The obtained composite (Y$^{21}$-1) in an amount of 98.0 g was taken out and was then dry-mixed with 2.0 g (corresponding to 2.0 mass % expressed in terms of carbon atoms in active substance) of the graphite with a ball mill to obtain a mixture (Y$^{21}$-1). Mixing treatment was conducted to the obtained mixture (Y$^{21}$-1) using Nobilta (NOB-130, manufactured by Hosokawa Micron Corporation, output of 5.5 kw) at a circumferential speed of the impeller of 30 m/s for 15 minutes to obtain a preliminary particle (Y$^{21}$-1) for a composite. The obtained preliminary particle (Y$^{21}$-1) for a composite was pyrolyzed at 650° C. for 1 hour under a reducing atmosphere to obtain a positive electrode active substance (Li$_2$Fe$_{0.28}$Mn$_{0.66}$Zr$_{0.03}$SiO$_4$, amount of carbon=9.0 mass %) for a lithium ion secondary cell as a composite (Z$^{21}$-1).

Example 2-2

A positive electrode active substance (Li$_2$Fe$_{0.28}$Mn$_{0.66}$Zr$_{0.03}$SiO$_4$, amount of carbon=10.0 mass %) for a lithium ion secondary cell was obtained using the composite (Y$^{21}$-1) obtained in Example 2-1 in the same manner as in Example 2-1 except that 97.0 g of the composite (Y$^{21}$-1) and 3.0 g (corresponding to 3.0 mass % expressed in terms of carbon atoms in active substance) of the graphite were mixed.

Comparative Example 2-1

A positive electrode active substance (LiFe$_{0.2}$Mn$_{0.8}$PO$_4$, amount of carbon=7.0 mass %) for a lithium ion secondary cell was obtained using the composite (Y$^{21}$-1) obtained in Example 2-1 in the same manner as in Example 2-1 except that the carbon source, such as graphite, other than the cellulose nanofiber was not added to the composite (Y$^{21}$-1).

Example 3-1

Slurry was obtained by mixing 0.60 kg of NaOH, 9.0 L of water, and 0.51 g of the CNF. Subsequently, 0.577 kg of the 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours to obtain slurry (X$^{31}$-1) comprising a composite (X$^{31}$-1). The slurry (X$^{31}$-1) comprised 3.00 mol of sodium based on 1 mol of phosphorus. Subsequently, the obtained slurry (X$^{31}$-1) was purged with the nitrogen gas to adjust the dissolved oxygen concentration to 0.5 mg/L, 0.139 kg of FeSO$_4$.7H$_2$O, 0.964 kg of MnSO$_4$.5H$_2$O, and 0.124 kg of MgSO$_4$.7H$_2$O were then added to the slurry ($X^{31}$-1), and the resultant mixture was mixed to obtain slurry ($Y^{31}$-1). Subsequently, the obtained slurry ($Y^{31}$-1) was put into the autoclave purged with a nitrogen gas to conduct hydrothermal reaction at 200° C. for 3 hours. The pressure in the autoclave was 1.4 MPa. A produced crystal was filtered and then washed with 12 mass parts of water based on 1 mass part of the crystal. The washed crystal was freeze-dried at −50° C. for 12 hours to obtain a composite ($Y^{31}$-1) (powder, chemical composition represented by formula (C): $NaFe_{0.1}Mn_{0.8}Mg_{0.1}PO_4$, amount of carbon derived from CNF of 1.5 mass %).

The obtained composite ($Y^{31}$-1) in an amount of 98.0 g was taken out and was then dry-mixed with 2.0 g (corresponding to 2.0 mass % expressed in terms of carbon atoms in active substance) of the graphite with the ball mill to obtain a mixture ($Y^{31}$-1). Mixing treatment was conducted to the obtained mixture ($Y^{31}$-1) using Nobilta (NOB-130, manufactured by Hosokawa Micron Corporation, output of 5.5 kw) at a circumferential speed of the impeller of 30 m/s for 15 minutes to obtain a preliminary particle ($Y^{31}$-1) for a composite.

Subsequently, the obtained preliminary particle ($Y^{31}$-1) for a composite was pyrolyzed at a temperature of 700° C. for 1 hour using the electric furnace purged with a nitrogen gas to obtain a positive electrode active substance ($NaFe_{0.1}Mn_{0.8}Mg_{0.1}PO_4$, amount of carbon=3.5 mass %) for a sodium ion secondary cell.

Example 3-2

A positive electrode active substance ($NaFe_{0.1}Mn_{0.9}Mg_{0.1}PO_4$, amount of carbon=4.5 mass %) for a sodium ion secondary cell was obtained using the composite ($Y^{31}$-1) obtained in Example 3-1 in the same manner as in Example 3-1 except that 97.0 g of the composite ($Y^{31}$-1) and 3.0 g (corresponding to 3.0 mass % expressed in terms of carbon atoms in active substance) of the graphite were mixed.

Comparative Example 3-1

A positive electrode active substance ($NaFe_{0.1}Mn_{0.8}Mg_{0.1}PO_4$, amount of carbon=1.6 mass %) for a sodium ion secondary cell was obtained using the composite ($Y^{31}$-1) obtained in Example 3-1 in the same manner as in Example 3-1 except that 99.9 g of the composite ($Y^{31}$-1) and 0.1 g (corresponding to 0.1 mass % expressed in terms of carbon atoms in active substance) of the Ketjen black were mixed.

Comparative Example 3-2

A positive electrode active substance ($NaFe_{0.1}Mn_{0.8}Mg_{0.1}PO_4$, amount of carbon=1.5 mass %) for a sodium ion secondary cell was obtained using the composite ($Y^{31}$-1) obtained in Example 3-1 in the same manner as in Example 3-1 except that the carbon source, such as graphite, other than the cellulose nanofiber was not added to such composite ($Y^{31}$-1).

<<Measurement of Amount of Adsorbed Water>>

The amount of the adsorbed water for each positive electrode active substance obtained in Examples 1-1 to 3-2 and Comparative Examples 1-1 to 3-2 was measured according to the following method.

The amount of water volatilized from a start point to an end point, wherein when the positive electrode active substance (composite particle) was left to stand in an environment of a temperature of 20° C. and a relative humidity of 50% for one day to adsorb water until an equilibrium was achieved, the temperature was then raised to 150° C. where the temperature was kept for 20 minutes, and the temperature was then further raised to 250° C. where the temperature was kept for 20 minutes, the start point is defined as the time when raising the temperature was restarted from 150° C., and the end point is defined as the time when the state of the constant temperature at 250° C. was completed, was measured with a Karl Fischer moisture titrator (MKC-610, manufactured by Kyoto Electronics Manufacturing Co., Ltd.) to determine the amount of the adsorbed water in the positive electrode active substance.

The results are shown in Tables 1 to 3.

<<Evaluation of Charge and Discharge Properties Using Secondary Cells>>

Positive electrodes for a lithium ion secondary cell or a sodium ion secondary cell were prepared using each positive electrode active substance obtained in Examples 1-1 to 3-2 and Comparative Examples 1-1 to 3-2. Specifically, the obtained positive electrode active substance, the Ketjen black, and polyvinylidene fluoride were mixed in a blending ratio of 90:3:7 in terms of a weight ratio, N-methyl-2-pyrrolidone was then added thereto, and the resultant mixture was kneaded sufficiently to prepare a positive electrode slurry. The positive electrode slurry was applied on a current collector made of aluminum foil having a thickness of 20 μm using a coating machine to conduct vacuum drying at 80° C. for 12 hours. Thereafter, it was punched in a ϕ 14 mm disk shape and was pressed using a hand press at 16 MPa for 2 minutes to produce a positive electrode.

Subsequently, a coin type secondary cell was assembled using the positive electrode. As a negative electrode, lithium foil punched in a ϕ 15 mm disk shape was used. As an electrolytic solution, a solution obtained by dissolving $LiPF_6$ (in the case of lithium ion secondary cell) or $NaPF_6$ (in the case of sodium ion secondary cell) in a mixed solvent obtained by mixing ethylene carbonate and ethyl methyl carbonate in a volume ratio of 1:1 so that the concentration of $LiPF_6$ or $NaPF_6$ might be 1 mol/L was used. As a separator, a known separator such as a porous polymer film such as polypropylene was used. These cell parts were incorporated and accommodated under an atmosphere in which the dew point thereof is −50° C. or less by an ordinary method to produce the coin type secondary cell (CR-2032).

Charge and discharge tests were conducted using the produced secondary cells. In the case of the lithium ion cell, the discharge capacity at 1 CA was determined setting the discharge conditions to constant current and constant voltage discharge at a current of 1 CA (330 mA/g) and a voltage of 4.5 V and setting the discharge conditions to constant current discharge at 1 CA (330 mA/g) and a final voltage of 1.5 V. In the case of the sodium ion cell, the discharge capacity at 1CA was determined setting the charge conditions to constant current and constant voltage discharge at a current of 1 CA (154 mA/g) and a voltage of 4.5 V and setting the discharge conditions to constant current discharge at 1 CA (154 mA/g) and a final voltage of 2.0 V. Further, repeated tests of 50 cycles were conducted under the similar charge-discharge conditions to determine capacity retention rates (%) according to the following formula (2). It is to be noted that all the charge and discharge tests were conducted at 30° C.

$$\text{Capacity retention rate (\%)} = (\text{discharge capacity after 50 cycles})/(\text{discharge capacity after 2 cycles}) \times 100 \quad (2)$$

The results are shown in Tables 1 to 3.

TABLE 1

| | | Example 1-1 | Example 1-2 | Example 1-3 | Example 1-4 | Example 1-5 |
|---|---|---|---|---|---|---|
| Composite X | Chemical composition of olivine type positive electrode material | $LiFe_{0.2}Mn_{0.8}PO_4$ | $LiFe_{0.2}Mn_{0.8}PO_4$ | $LiFe_{0.2}Mn_{0.8}PO_4$ | $LiFe_{0.2}Mn_{0.8}PO_4$ | $LiFe_{0.2}Mn_{0.8}PO_4$ |
| | Amount added to positive electrode active substance (mass parts) | 98.0 | 98.0 | 98.0 | 98.0 | 99.5 |
| Carbon source added to composite X | Kind | Graphite[*1] | Graphite[*1] | Graphite[*1] | Flake graphite[*2] | Graphite[*1] |
| | Specific surface area ($m^2/g$) | 5.0 | 5.0 | 5.0 | 13.2 | 5.0 |
| | Amount added (mass parts) | 2.0 | 2.0 | 2.0 | 2.0 | 0.5 |
| Mechanofusion treatment conditions | Circumferential speed of impeller (m/s) | 30 | 30 | 30 | 30 | 30 |
| | Treatment time (min) | 15 | 15 | 15 | 15 | 15 |
| Pyrolyzing conditions | Temperature (° C.) | 750 | 750 | 750 | 750 | 750 |
| | Time (min) | 90 | 90 | 90 | 90 | 90 |
| Positive electrode active substance | Oxide (mass %) | 96.5 | 97.5 | 97.0 | 96.5 | 98 |
| | Amount of cellulose nanofiber expressed in terms of carbon atoms (mass %) | 1.5 | 0.5 | 1.0 | 1.5 | 1.5 |
| | Amount of carbon source added to composite X (mass %) | 2.0 | 2.0 | 2.0 | 2.0 | 0.5 |
| | Graphite/cellulose nanofiber | 1.3 | 4.0 | 2.0 | 1.3 | 0.3 |
| | Tap density ($g/cm^3$) | 1.40 | 1.38 | 1.41 | 1.42 | 1.46 |
| | Amount of adsorbed water (ppm) | 356 | 384 | 366 | 372 | 512 |
| Cell | 0.1 C Discharge capacity (mAh/g) | 159 | 153 | 156 | 157 | 161 |
| | Capacity retention rate (%) | 94 | 95 | 96 | 94 | 93 |

| | | Example 1-6 | Example 1-7 | Example 1-8 |
|---|---|---|---|---|
| Composite X | Chemical composition of olivine type positive electrode material | $LiFe_{0.2}Mn_{0.8}PO_4$ | $LiFe_{0.18}Mn_{0.80}Mg_{0.02}PO_4$ | $LiFe_{0.18}Mn_{0.80}Zr_{0.01}PO_4$ |
| | Amount added to positive electrode active substance (mass parts) | 97.0 | 98.0 | 98.0 |
| Carbon source added to composite X | Kind | Graphite[*1] | Graphite[*1] | Graphite[*1] |
| | Specific surface area ($m^2/g$) | 5.0 | 5.0 | 5.0 |
| | Amount added (mass parts) | 3.0 | 2.0 | 2.0 |
| Mechanofusion treatment conditions | Circumferential speed of impeller (m/s) | 30 | 30 | 30 |
| | Treatment time (min) | 15 | 15 | 15 |
| Pyrolyzing conditions | Temperature (° C.) | 750 | 750 | 750 |
| | Time (min) | 90 | 90 | 90 |
| Positive electrode active substance | Oxide (mass %) | 95.5 | 96.5 | 96.5 |
| | Amount of cellulose nanofiber expressed in terms of carbon atoms (mass %) | 1.5 | 1.5 | 1.5 |
| | Amount of carbon source added to composite X (mass %) | 3.0 | 2.0 | 2.0 |
| | Graphite/cellulose nanofiber | 2.0 | 1.3 | 1.3 |
| | Tap density ($g/cm^3$) | 1.39 | 1.41 | 1.43 |
| | Amount of adsorbed water (ppm) | 347 | 361 | 387 |
| Cell | 0.1 C Discharge capacity (mAh/g) | 156 | 157 | 158 |
| | Capacity retention rate (%) | 94 | 96 | 93 |

[*1]UP-5N manufactured by Nippon Graphite Industries, Co., Ltd. Average particle diameter of 6.1 μm
[*2]SG-BH8 manufactured by Ito Graphite Co., Ltd. Average particle diameter of 8.6 μm

TABLE 2

| | | Comparative Example 1-1 | Comparative Example 1-2 | Comparative Example 1-3 | Comparative Example 1-4 |
|---|---|---|---|---|---|
| Composite X | Chemical composition of olivine type positive electrode material | $LiFe_{0.2}Mn_{0.8}PO_4$ | $LiFe_{0.2}Mn_{0.8}PO_4$ | $LiFe_{0.2}Mn_{0.8}PO_4$ | $LiFePO_4$ |
| | Amount added to positive electrode active substance (mass parts) | 100.0 | 98.0 | 98.0 | 98.0 |

TABLE 2-continued

| | | Comparative Example 1-1 | Comparative Example 1-2 | Comparative Example 1-3 | Comparative Example 1-4 |
|---|---|---|---|---|---|
| Carbon source added to composite X | Kind | None | Ketjen black*3 | Graphite*1 | Ketjen black*3 |
| | Specific surface area (m$^2$/g) | | 800 | 5.0 | 800 |
| | Amount added (mass parts) | | 2.0 | 2.0 | 2.0 |
| Mechanofusion treatment conditions | Circumferential speed of impeller (m/s) | 0 | 30 | 30 | 30 |
| | Treatment time (min) | 0 | 15 | 15 | 15 |
| Pyrolyzing conditions | Temperature (° C.) | 750 | 750 | 750 | 750 |
| | Time (min) | 90 | 90 | 90 | 90 |
| Positive electrode active substance | Oxide (mass %) | 98.5 | 96.5 | 98 | 96.5 |
| | Amount of cellulose nanofiber expressed in terms of carbon atoms (mass %) | 1.5 | 1.5 | 0.0 | 1.5 |
| | Amount of carbon source added to composite X (mass %) | 0.0 | 2.0 | 2.0 | 2.0 |
| | Graphite/cellulose nanofiber | 0.0 | 1.3 | — | 1.3 |
| | Tap density (g/cm$^3$) | 1.16 | 1.38 | 1.4 | 13.6 |
| | Amount of adsorbed water (ppm) | 3870 | 2960 | 391 | 3060 |
| Cell | 0.1 C Discharge capacity (mAh/g) | 156 | 157 | 46 | 135 |
| | Capacity retention rate (%) | 84 | 86 | 83 | 82 |

*1UP-5N manufactured by Nippon Graphite Industries, Co., Ltd. Average particle diameter of 6.1 μm
*3Manufactured by Lion Corporation Average particle diameter of 30 μm

TABLE 3

| | | Example 2-1 | Example 2-2 | Comparative Example 2-1 |
|---|---|---|---|---|
| Composite X | Chemical composition of olivine type positive electrode material | Li$_2$Fe$_{0.28}$Mn$_{0.66}$Zr$_{0.03}$SiO$_4$ | Li$_2$Fe$_{0.28}$Mn$_{0.66}$Zr$_{0.03}$SiO$_4$ | Li$_2$Fe$_{0.28}$Mn$_{0.66}$Zr$_{0.03}$SiO$_4$ |
| | Amount added to positive electrode active substance (mass parts) | 98.0 | 97.0 | 100.0 |
| Carbon source added to composite X | Kind | Graphite*1 | Graphite*1 | None |
| | Specific surface area (m$^2$/g) | 5.0 | 5.0 | |
| | Amount added (mass parts) | 2.0 | 2.0 | |
| Mechanofusion treatment conditions | Circumferential speed of impeller (m/s) | 30 | 30 | 0 |
| | Treatment time (min) | 15 | 15 | 0 |
| Pyrolyzing conditions | Temperature (° C.) | 650 | 650 | 650 |
| | Time (min) | 60 | 60 | 60 |
| Positive electrode active substance | Oxide (mass %) | 91.0 | 90.0 | 93.0 |
| | Amount of cellulose nanofiber expressed in terms of carbon atoms (mass %) | 7.0 | 7.0 | 7.0 |
| | Amount of carbon source added to composite X (mass %) | 2.0 | 3.0 | 0.0 |
| | Graphite/cellulose nanofiber | 0.3 | 0.4 | 0.0 |
| | Tap density (g/cm$^3$) | 1.33 | 1.32 | 0.99 |
| | Amount of adsorbed water (ppm) | 720 | 700 | 3000 |
| Cell | 0.1 C Discharge capacity (mAh/g) | 214 | 216 | 201 |
| | Capacity retention rate (%) | 34 | 35 | 23 |

| | | Example 3-1 | Example 3-2 |
|---|---|---|---|
| Composite X | Chemical composition of olivine type positive electrode material | NaFe$_{0.1}$Mn$_{0.8}$Mg$_{0.1}$PO$_4$ | NaFe$_{0.1}$Mn$_{0.8}$Mg$_{0.1}$PO$_4$ |
| | Amount added to positive electrode active substance (mass parts) | 98.0 | 97.0 |
| Carbon source added to composite X | Kind | Graphite*1 | Graphite*1 |
| | Specific surface area (m$^2$/g) | 5.0 | 5.0 |
| | Amount added (mass parts) | 2.0 | 3.0 |
| Mechanofusion treatment conditions | Circumferential speed of impeller (m/s) | 30 | 30 |
| | Treatment time (min) | 15 | 15 |
| Pyrolyzing conditions | Temperature (° C.) | 700 | 700 |
| | Time (min) | 60 | 60 |
| Positive electrode active substance | Oxide (mass %) | 96.5 | 95.5 |
| | Amount of cellulose nanofiber expressed in terms of carbon atoms (mass %) | 1.5 | 1.5 |
| | Amount of carbon source added to composite X (mass %) | 2.0 | 3.0 |
| | Graphite/cellulose nanofiber | 1.3 | 2.0 |
| | Tap density (g/cm$^3$) | 1.41 | 1.40 |
| | Amount of adsorbed water (ppm) | 320 | 240 |

TABLE 3-continued

| | | Comparative Example 3-1 | Comparative Example 3-2 |
|---|---|---|---|
| Cell | 0.1 C Discharge capacity (mAh/g) | 120 | 127 |
| | Capacity retention rate (%) | 94 | 95 |
| Composite X | Chemical composition of olivine type positive electrode material | $NaFe_{0.1}Mn_{0.8}Mg_{0.1}PO_4$ | $NaFe_{0.1}Mn_{0.8}Mg_{0.1}PO_4$ |
| | Amount added to positive electrode active substance (mass parts) | 99.9 | 100.0 |
| Carbon source added to composite X | Kind | Ketjen black*3 | None |
| | Specific surface area (m²/g) | 800 | |
| | Amount added (mass parts) | 0.1 | |
| Mechanofusion treatment conditions | Circumferential speed of impeller (m/s) | 30 | 0 |
| | Treatment time (min) | 15 | 0 |
| Pyrolyzing conditions | Temperature (° C.) | 700 | 700 |
| | Time (min) | 60 | 60 |
| Positive electrode active substance | Oxide (mass %) | 98.4 | 98.5 |
| | Amount of cellulose nanofiber expressed in terms of carbon atoms (mass %) | 1.5 | 1.5 |
| | Amount of carbon source added to composite X (mass %) | 0.1 | 0.0 |
| | Graphite/cellulose nanofiber | 0.07 | 0.0 |
| | Tap density (g/cm³) | 1.22 | 1.12 |
| | Amount of adsorbed water (ppm) | 1650 | 1820 |
| Cell | 0.1 C Discharge capacity (mAh/g) | 115 | 115 |
| | Capacity retention rate (%) | 89 | 89 |

*1UP-5N manufactured by Nippon Graphite Industries, Co., Ltd. Average particle diameter of 6.1 μm
*3Manufactured by Lion Corporation Average particle diameter of 30 μm Example 4-1

Slurry was obtained by mixing 12.72 g of LiOH.H$_2$O, 90 mL of water, and 6.8 g (corresponding to 2.0 mass % expressed in terms of carbon atoms in active substance) of the cellulose nanofiber (CELISH KY-100G, manufactured by Daicel FineChem Ltd., fiber diameter of 4 to 100 nm, CNF for short). Subsequently, 11.53 g of the 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours under the nitrogen gas purge to obtain a mixture ($X^{41}$-2a) (slurry ($X^{41}$-2a), dissolved oxygen concentration of 0.5 mg/L) comprising a composite ($X^{41}$-2a). The slurry ($X^{41}$-2a) comprised 2.97 mol of lithium based on 1 mol of phosphorus.

Subsequently, 5.56 g of FeSO$_4$.7H$_2$O and 19.29 g of MnSO$_4$.5H$_2$O were added to 121.0 g of the obtained slurry ($X^{41}$-2a), and the resultant mixture was mixed to obtain slurry ($Y^{41}$-2a). Subsequently, the obtained slurry ($Y^{41}$-2a) was put into an autoclave to conduct hydrothermal reaction at 170° C. for 1 hour. The pressure in the autoclave was 0.8 MPa. A produced crystal was filtered and then washed with 12 mass parts of water based on 1 mass part of the crystal. The washed crystal was freeze-dried at −50° C. for 12 hours to obtain a composite ($Y^{41}$-2a) (chemical composition of compound represented by formula (A): $LiMn_{0.8}Fe_{0.2}PO_4$, BET specific surface area of 21 m²/g, average particle diameter of 60 nm).

The obtained composite ($Y^{41}$-2a) in an amount of 10 g was taken out, 0.25 g (corresponding to 1.0 mass % expressed in terms of carbon atoms in active substance) of glucose and 10 mL of water were then added thereto, and the resultant mixture was mixed, then dried at 80° C. for 12 hours, and then pyrolyzed at 700° C. for 1 hour under the reducing atmosphere to obtain a positive electrode active substance ($LiFe_{0.2}Mn_{0.8}PO_4$, amount of carbon=3.0 mass %) for a lithium secondary cell.

Example 4-2

A positive electrode active substance ($LiFe_{0.2}Mn_{0.8}PO_4$, amount of carbon=4.0 mass %) for a lithium secondary cell was obtained in the same manner as in Example 4-1 except that the amount of glucose added to the composite ($Y^{41}$-2a) was changed to 0.5 g (corresponding to 2.0 mass % expressed in terms of carbon atoms in active substance).

Example 4-3

A positive electrode active substance ($LiFe_{0.2}Mn_{0.8}PO_4$, amount of carbon=4.9 mass %) for a lithium secondary cell was obtained in the same manner as in Example 4-1 except that the amount of glucose added to the composite ($Y^{41}$-2a) was changed to 0.75 g (corresponding to 2.9 mass % expressed in terms of carbon atoms in active substance).

Comparative Example 4-1

A positive electrode active substance ($LiFe_{0.2}Mn_{0.8}PO_4$, amount of carbon=2.0 mass %) for a lithium secondary cell was obtained in the same manner as in Example 4-1 except that glucose was not added.

Example 5-1

Slurry was obtained by mixing 37.5 mL of ultrapure water with 4.28 g of LiOH.H$_2$O and 13.97 g of Na$_4$SiO$_4$.nH$_2$O. To the slurry, 14.9 g (corresponding to 8.0 mass % expressed in terms of carbon atoms in active substance) of the cellulose nanofiber (CELISH KY-100G, manufactured by Daicel FineChem Ltd., fiber diameter of 4 to 100 nm, CNF for short), 3.92 g of FeSO$_4$.7H$_2$O, 7.93 g of MnSO$_4$.5H$_2$O, and 0.53 g of Zr(SO$_4$)$_2$.4H$_2$O were added, and the resultant mixture was stirred at a speed of 400 rpm for 30 minutes, during which the temperature was kept at 25° C., to obtain slurry ($Y^{51}$-2a).

Subsequently, the obtained slurry ($Y^{51}$-2a) was put into a synthesis container installed in a steam heating type autoclave. After the slurry was put into the synthesis container, the slurry was heated while being stirred at 150° C. for 12 hours using saturated steam obtained by heating water (dissolved oxygen concentration of less than 0.5 mg/L) with a diaphragm separation apparatus. The pressure in the autoclave was 0.4 MPa. A produced crystal was filtered and then washed with 12 mass parts of water based on 1 mass part of the crystal. The washed crystal was freeze-dried at −50° C. for 12 hours to obtain a composite ($Y^{51}$-2a) (chemical composition of compound represented by formula (B): $Li_2Fe_{0.28}Mn_{0.66}Zr_{0.03}SiO_4$, BET specific surface area of 35 m$^2$/g, average particle diameter of 50 nm).

The obtained composite ($Y^{51}$-2a) in an amount of 5.0 g was taken out, 0.125 g (corresponding to 1.0 mass % expressed in terms of carbon atoms in active substance) of glucose and 5 mL of water were then added thereto, and the resultant mixture was mixed, then dried at 80° C. for 12 hours, and then pyrolyzed at 650° C. for 1 hour under the reducing atmosphere to obtain a positive electrode active substance ($Li_2Fe_{0.28}Mn_{0.66}Zr_{0.03}SiO_4$, amount of carbon=9.0 mass %) for a lithium secondary cell.

Example 5-2

A positive electrode active substance ($Li_2Fe_{0.28}Mn_{0.66}Zr_{0.03}SiO_4$, amount of carbon=10.0 mass %) for a lithium secondary cell was obtained in the same manner as in Example 5-1 except that the amount of glucose added to the composite ($Y^{51}$-2a) was changed to 0.25 g (corresponding to 2.0 mass % expressed in terms of carbon atoms in active substance).

Example 5-3

A positive electrode active substance ($Li_2Fe_{0.28}Mn_{0.66}Zr_{0.03}SiO_4$, amount of carbon=10.9 mass %) for a lithium secondary cell was obtained in the same manner as in Example 5-1 except that the amount of glucose added to the composite ($Y^{51}$-2a) was changed to 0.375 g (corresponding to 2.9 mass % expressed in terms of carbon atoms in active substance).

Comparative Example 5-1

A positive electrode active substance ($Li_2Fe_{0.28}Mn_{0.66}Zr_{0.03}SiO_4$, amount of carbon=13.7 mass %) for a lithium secondary cell was obtained in the same manner as in Example 5-1 except that the amount of glucose added to the composite ($Y^{51}$-2a) was changed to 0.75 g (corresponding to 5.7 mass % expressed in terms of carbon atoms in active substance).

Comparative Example 5-2

A positive electrode active substance ($Li_2Fe_{0.28}Mn_{0.66}Zr_{0.03}SiO_4$, amount of carbon=8.0 mass %) for a lithium secondary cell was obtained in the same manner as in Example 5-1 except that glucose was not added.

Example 6-1

Slurry was obtained by mixing 6.00 of NaOH, 90 mL of water, and 5.10 g (corresponding to 1.3 mass % expressed in terms of carbon atoms in active substance) of the cellulose nanofiber. Subsequently, 5.77 g of the 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours to obtain slurry ($X^{61}$-2a) comprising a composite ($X^{61}$-2a). The slurry ($X^{61}$-2a) comprised 3.00 mol of sodium based on 1 mol of phosphorus. The obtained slurry was purged with the nitrogen gas to adjust the dissolved oxygen concentration to 0.5 mg/L, and 1.39 g of $FeSO_4·7H_2O$, 9.64 g of $MnSO_4·5H_2O$, and 1.24 g of $MgSO_4·7H_2O$ were then added to the slurry to obtain slurry ($Y^{61}$-2a). Subsequently, the obtained slurry ($Y^{61}$-2a) was put into a synthesis container which was installed in a steam heating type autoclave and which was purged with a nitrogen gas. After the slurry was put into the synthesis container, the slurry was heated while being stirred at 200° C. for 3 hours using saturated steam obtained by heating water (dissolved oxygen concentration of less than 0.5 mg/L) with the diaphragm separation apparatus. The pressure in the autoclave was 1.4 MPa. A produced crystal was filtered and then washed with 12 mass parts of water based on 1 mass part of the crystal. The washed crystal was freeze-dried at −50° C. for 12 hours to obtain a composite ($Y^{61}$-2a) (chemical composition of compound represented by formula (C): $NaFe_{0.1}Mn_{0.8}Mg_{0.1}PO_4$, BET specific surface area of 15 m$^2$/g, average particle diameter of 100 nm).

The obtained composite ($Y^{61}$-2a) in an amount of 5.0 g was taken out, 0.125 g (corresponding to 1.0 mass % expressed in terms of carbon atoms in active substance) of glucose and 5 mL of water were then added thereto, and the resultant mixture was mixed, then dried at 80° C. for 12 hours, and then pyrolyzed at 700° C. for 1 hour under the reducing atmosphere to obtain a positive electrode active substance ($NaFe_{0.2}Mn_{0.8}PO_4$, amount of carbon=2.3 mass %) for a sodium secondary cell.

Example 6-2

A positive electrode active substance ($NaFe_{0.2}Mn_{0.8}PO_4$, amount of carbon=3.3 mass %) for a sodium secondary cell was obtained in the same manner as in Example 6-1 except that the amount of glucose added to the composite ($Y^{61}$-2a) was changed to 0.25 g (corresponding to 2.0 mass % expressed in terms of carbon atoms in active substance).

Example 6-3

A positive electrode active substance ($NaFe_{0.2}Mn_{0.8}PO_4$, amount of carbon=4.2 mass %) for a sodium secondary cell was obtained in the same manner as in Example 6-1 except that the amount of glucose added to the composite ($Y^{61}$-2a) was changed to 0.375 g (corresponding to 2.9 mass % expressed in terms of carbon atoms in active substance).

Comparative Example 6-1

A positive electrode active substance ($NaFe_{0.2}Mn_{0.8}PO_4$, amount of carbon=1.3 mass %) for a sodium secondary cell was obtained in the same manner as in Example 6-1 except that glucose was not added.

<<Measurement of Amount of Adsorbed Water and Evaluation of Charge and Discharge Properties Using Secondary Cells>>

The measurement of the amount of the adsorbed water and the evaluation of the charge and discharge properties using secondary cells were conducted for each positive electrode active substance obtained in Examples 4-1 to 6-3 and Comparative Examples 4-1 to 6-1 in the same manner as in Examples 1-1 to 3-2 and Comparative Examples 1-1 to 3-2.

The results are shown in Tables 4 to 5.

TABLE 4

| | Amount supported in 100 mass % of active substance (mass %) | | |
|---|---|---|---|
| | Cellulose nanofiber (expressed in terms of carbon atoms) | Water-soluble carbon material (expressed in terms of carbon atoms) | 250° C. Amount of water (ppm) |
| Example 4-1 | 2.0 | 1.0 | 426 |
| Example 4-2 | 2.0 | 2.0 | 356 |
| Example 4-3 | 2.0 | 2.9 | 458 |
| Comparative Example 4-1 | 2.0 | 0.0 | 2157 |
| Example 5-1 | 8.0 | 1.0 | 2070 |
| Example 5-2 | 8.0 | 2.0 | 1570 |
| Example 5-3 | 8.0 | 2.9 | 2150 |
| Comparative Example 5-1 | 8.0 | 5.7 | 2750 |
| Comparative Example 5-2 | 8.0 | 0.0 | 3000 |
| Example 6-1 | 1.3 | 1.0 | 360 |
| Example 6-2 | 1.3 | 2.0 | 290 |
| Example 6-3 | 1.3 | 2.9 | 400 |
| Comparative Example 6-1 | 1.3 | 0.0 | 1820 |

TABLE 5

| | Initial discharge capacity at 1 C (mAh/g) | Capacity retention rate (%) |
|---|---|---|
| Example 4-1 | 153 | 94 |
| Example 4-2 | 156 | 95 |
| Example 4-3 | 153 | 94 |
| Comparative Example 4-1 | 151 | 91 |
| Example 5-1 | 205 | 31 |
| Example 5-2 | 216 | 33 |
| Example 5-3 | 203 | 30 |
| Comparative Example 5-1 | 188 | 22 |
| Comparative Example 5-2 | 201 | 23 |
| Example 6-1 | 119 | 93 |
| Example 6-2 | 126 | 95 |
| Example 6-3 | 118 | 93 |
| Comparative Example 6-1 | 115 | 88 |

Example 7-1

Slurry was obtained by mixing 12.72 g of $LiOH \cdot H_2O$, 90 mL of water, and 6.8 g (corresponding to 2.0 mass % expressed in terms of carbon atoms in active substance) of the cellulose nanofiber (CELISH KY-100G, manufactured by Daicel FineChem Ltd., fiber diameter of 4 to 100 nm, CNF for short). Subsequently, 11.53 g of the 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours under the nitrogen gas purge to obtain a mixture ($X^{71}$-2b) (slurry ($X^{71}$-2b), dissolved oxygen concentration of 0.5 mg/L) comprising a composite ($X^{71}$-2b).

The slurry ($X^{71}$-2b) comprised 2.97 mol of lithium based on 1 mol of phosphorus.

Subsequently, 5.56 g of $FeSO_4 \cdot 7H_2O$ and 19.29 g of $MnSO_4 \cdot 5H_2O$ were added to 121.0 g of the obtained slurry ($X^{71}$-2b), and the resultant mixture was mixed to obtain slurry ($Y^{71}$-2b). Subsequently, the obtained slurry ($Y^{71}$-2b) was put into an autoclave to conduct hydrothermal reaction at 170° C. for 1 hour. The pressure in the autoclave was 0.8 MPa. A produced crystal was filtered and then washed with 12 mass parts of water based on 1 mass part of the crystal. The washed crystal was freeze-dried at −50° C. for 12 hours to obtain a composite ($Y^{71}$-2b) (chemical composition of compound represented by formula (A): $LiMn_{0.8}Fe_{0.2}PO_4$, BET specific surface area of 21 $m^2/g$, average particle diameter of 60 nm).

A composite ($Y^{71}$-2b) supporting LiF was obtained by mixing 4.0 g of the obtained composite ($Y^{71}$-2b), 0.033 g of LiOH, and 0.029 g (corresponding to 0.5 mass % expressed in terms of amount of LiF supported in positive electrode active substance for lithium ion secondary cell) with 5 ml of water and then stirring the resultant mixture for 1 hour. Subsequently, the composite ($Y^{71}$-2b) was pyrolyzed at 700° C. for 1 hour under the reducing atmosphere to obtain a positive electrode active substance ($LiFe_{0.2}Mn_{0.8}PO_4$, amount of carbon=2.0 mass %, amount of LiF=0.5 mass %) for a lithium ion secondary cell.

Example 7-2

A positive electrode active substance ($LiFe_{0.2}Mn_{0.8}PO_4$, amount of carbon=2.0 mass %, amount of LiF=1.0 mass %) for a lithium ion secondary cell was obtained in the same manner as in Example 7-1 except that the amount of LiOH added to the composite ($Y^{71}$-2b) was changed to 0.066 g, and the amount of ammonium fluoride added to the composite ($Y^{71}$-2b) was changed to 0.059 g (corresponding to 1.0 mass % expressed in terms of amount of LiF supported in positive electrode active substance for lithium ion secondary cell).

Example 7-3

A positive electrode active substance ($LiFe_{0.2}Mn_{0.8}PO_4$, amount of carbon=2.0 mass %, amount of LiF=2.0 mass %) for a lithium ion secondary cell was obtained in the same manner as in Example 7-1 except that the amount of LiOH added to the composite ($Y^{71}$-2b) was changed to 0.132 g, and the amount of ammonium fluoride added to the composite ($Y^{71}$-2b) was changed to 0.118 g (corresponding to 2.0 mass % expressed in terms of amount of LiF supported in positive electrode active substance for lithium ion secondary cell).

Example 7-4

A positive electrode active substance ($LiFe_{0.2}Mn_{0.8}PO_4$, amount of carbon=2.0 mass %, amount of $AlF_3$=2.0 mass %) for a lithium ion secondary cell was obtained in the same manner as in Example 7-1 except that 0.078 g of $Al(OH)_3$ in place of LiOH added to the composite ($Y^{71}$-2b) was added, and the amount of ammonium fluoride added to the composite ($Y^{71}$-2b) was changed to 0.353 g (corresponding to 2.0 mass % expressed in terms of amount of $AlF_3$ supported in positive electrode active substance for lithium ion secondary cell).

Example 7-5

A positive electrode active substance ($LiFe_{0.2}Mn_{0.8}PO_4$, amount of carbon=2.0 mass %, amount of $MgF_3$=2.0 mass %) for a lithium ion secondary cell was obtained in the same manner as in Example 7-1 except that 0.277 g of Mg(CH$_3$COO)$_2$.4H$_2$O in place of LiOH added to the composite (Y$^{71}$-2b) was added, and the amount of ammonium fluoride added to the composite (Y$^{71}$-2b) was changed to 0.236 g (corresponding to 2.0 mass % expressed in terms of amount of MgF$_2$ supported in positive electrode active substance for lithium ion secondary cell).

Comparative Example 7-1

A positive electrode active substance (LiFe$_{0.2}$Mn$_{0.8}$PO$_4$, amount of carbon=2.0 mass %, amount of LiF=6.0 mass %) for a lithium ion secondary cell was obtained in the same manner as in Example 7-1 except that the amount of LiOH added to the composite (Y$^{71}$-2b) was changed to 0.396 g, and the amount of ammonium fluoride added to the composite (Y$^{71}$-2b) was changed to 0.353 g (corresponding to 6.0 mass % expressed in terms of amount of LiF supported in positive electrode active substance for lithium ion secondary cell).

Comparative Example 7-2

A positive electrode active substance (LiFe$_{0.2}$Mn$_{0.8}$PO$_4$, amount of carbon=2.0 mass %, amount of metal fluoride=0.0 mass %) for a lithium ion secondary cell was obtained in the same manner as in Example 7-1 except that the metal fluoride was not added.

Example 8-1

Slurry (X$^{81}$-2b) was obtained by mixing 37.5 mL of ultrapure water with 4.28 g of LiOH.H$_2$O and 13.97 g of Na$_4$SiO$_4$.nH$_2$O. To the slurry (X$^{81}$-2b), 14.9 g (corresponding to 7.2 mass % expressed in terms of carbon atoms in active substance) of the cellulose nanofiber (CELISH KY-100G, manufactured by Daicel FineChem Ltd., fiber diameter of 4 to 100 nm, CNF for short), 3.92 g of FeSO$_4$.7H$_2$O, 7.93 g of MnSO$_4$.5H$_2$O, and 0.53 g of Zr(SO$_4$)$_2$.4H$_2$O were added, and the resultant mixture was stirred at a speed of 400 rpm for 30 minutes, during which the temperature was kept at 25° C., to obtain slurry (X$^{81}$-2b).

Subsequently, the obtained slurry (X$^{81}$-2b) was put into the synthesis container installed in the steam heating type autoclave. After the slurry was put into the synthesis container, the slurry was heated while being stirred at 150° C. for 12 hours using saturated steam obtained by heating water (dissolved oxygen concentration of less than 0.5 mg/L) with the diaphragm separation apparatus. The pressure in the autoclave was 0.4 MPa. A produced crystal was filtered and then washed with 12 mass parts of water based on 1 mass part of the crystal. The washed crystal was freeze-dried at −50° C. for 12 hours to obtain a composite (Y$^{81}$-2b) (chemical composition of compound represented by formula (B): Li$_2$Fe$_{0.28}$Mn$_{0.66}$Zr$_{0.03}$SiO$_4$, BET specific surface area of 35 m$^2$/g, average particle diameter of 50 nm).

The obtained composite (Y$^{81}$-2b) in an amount of 4.0 g was taken out, 0.033 g of LiOH and 0.029 g (corresponding to 0.5 mass % expressed in terms of amount of LiF supported in positive electrode active substance for lithium ion secondary cell) of ammonium fluoride, and 5 mL of water were then mixed therewith, and the resultant mixture was stirred for 1 hour and then pyrolyzed at 650° C. for 1 hour under the reducing atmosphere to obtain a positive electrode active substance (Li$_2$Fe$_{0.28}$Mn$_{0.66}$Zr$_{0.03}$SiO$_4$, amount of carbon=7.2 mass %, amount of LiF=0.5 mass %) for a lithium ion secondary cell.

Example 8-2

A positive electrode active substance (Li$_2$Fe$_{0.28}$Mn$_{0.66}$Zr$_{0.03}$SiO$_4$, amount of carbon=7.2 mass %, amount of LiF=1.0 mass %) for a lithium ion secondary cell was obtained in the same manner as in Example 8-1 except that the amount of LiOH added to the composite (Y$^{81}$-2b) was changed to 0.066 g, and the amount of ammonium fluoride added to the composite (Y$^{81}$-2b) was changed to 0.059 g (corresponding to 1.0 mass % expressed in terms of amount of LiF supported in positive electrode active substance for lithium ion secondary cell).

Example 8-3

A positive electrode active substance (Li$_2$Fe$_{0.28}$Mn$_{0.66}$Zr$_{0.03}$SiO$_4$, amount of carbon=7.2 mass %, amount of LiF=2.0 mass %) for a lithium ion secondary cell was obtained in the same manner as in Example 8-1 except that the amount of LiOH added to the composite (Y$^{81}$-2b) was changed to 0.132 g, and the amount of ammonium fluoride added to the composite (Y$^{81}$-2b) was changed to 0.118 g (corresponding to 2.0 mass expressed in terms of amount of LiF supported in positive electrode active substance for lithium ion secondary cell).

Example 8-4

A positive electrode active substance (Li$_2$Fe$_{0.28}$Mn$_{0.66}$Zr$_{0.03}$SiO$_4$, amount of carbon=7.2 mass %, amount of AlF$_2$=2.0 mass %) for a lithium ion secondary cell was obtained in the same manner as in Example 8-1 except that 0.078 g of Al(OH)$_3$ in place of LiOH added to the composite (Y$^{81}$-2b) was added, and the amount of ammonium fluoride added to the composite (Y$^{81}$-2b) was changed to 0.353 g (corresponding to 2.0 mass % expressed in terms of amount of AlF$_2$ supported in positive electrode active substance for lithium ion secondary cell).

Example 8-5

A positive electrode active substance (Li$_2$Fe$_{0.28}$Mn$_{0.66}$Zr$_{0.03}$SiO$_4$, amount of carbon=7.2 mass %, amount of MgF$_2$=2.0 mass %) for a lithium ion secondary cell was obtained in the same manner as in Example 8-1 except that 0.277 g of Mg(CH$_3$COO)$_2$.4H$_2$O in place of LiOH added to the composite (Y$^{81}$-2b) was added, and the amount of ammonium fluoride added to the composite (Y$^{81}$-2b) was changed to 0.236 g (corresponding to 2.0 mass % expressed in terms of amount of MgF$_2$ supported in positive electrode active substance for lithium ion secondary cell).

Comparative Example 8-1

A positive electrode active substance (Li$_2$Fe$_{0.28}$Mn$_{0.66}$Zr$_{0.03}$SiO$_4$, amount of carbon=7.2 mass %, amount of LiF=6.0 mass %) for a lithium ion secondary cell was obtained in the same manner as in Example 8-1 except that the amount of LiOH added to the composite (Y$^{81}$-2b) was changed to 0.396 g, and the amount of ammonium fluoride added to the composite (Y$^{81}$-2b) was changed to 0.353 g (corresponding to 6.0 mass % expressed in terms of amount of LiF supported in positive electrode active substance for lithium ion secondary cell).

Comparative Example 8-21

A positive electrode active substance ($Li_2Fe_{0.28}Mn_{0.66}Zr_{0.03}SiO_4$, amount of carbon=7.2 mass %, amount of metal fluoride=0.0 mass %) for a lithium ion secondary cell was obtained in the same manner as in Example 8-1 except that the metal fluoride was not added.

Example 9-1

Slurry was obtained by mixing 6.00 g of NaOH, 90 mL of water, and 5.10 g (corresponding to 2.4 mass % expressed in terms of carbon atoms in active substance) of the cellulose nanofiber. Subsequently, 5.77 g of the 85% phosphoric acid aqueous solution was added dropwise to the obtained slurry at 35 mL/min while the obtained slurry was stirred for 5 minutes, during which the temperature was kept at 25° C., and subsequently, the resultant mixture was stirred at a speed of 400 rpm for 12 hours to obtain slurry ($X^{91}$-2b) comprising a composite ($X^{91}$-2b). The slurry ($X^{91}$-2b) comprised 3.00 mol of sodium based on 1 mol of phosphorus. The obtained slurry ($X^{91}$-2b) was purged with the nitrogen gas to adjust the dissolved oxygen concentration to 0.5 mg/L, and 1.39 g of $FeSO_4.7H_2O$, 9.64 g of $MnSO_4.5H_2O$, and 1.24 g of $MgSO_4.7H_2O$ were then added to the slurry to obtain slurry ($Y^{91}$-2b). Subsequently, the obtained slurry ($Y^{91}$-2b) was put into the synthesis container which was installed in the steam heating type autoclave and which was purged with a nitrogen gas. After the slurry was put into the synthesis container, the slurry was heated while being stirred at 200° C. for 3 hours using saturated steam obtained by heating water (dissolved oxygen concentration of less than 0.5 mg/L) with the diaphragm separation apparatus. The pressure in the autoclave was 1.4 MPa. A produced crystal was filtered and then washed with 12 mass parts of water based on 1 mass part of the crystal. The washed crystal was freeze-dried at −50° C. for 12 hours to obtain a composite ($Y^{91}$-2b) (chemical composition of compound represented by formula (C): $NaFe_{0.1}Mn_{0.8}Mg_{0.1}PO_4$, BET specific surface area of 15 m$^2$/g, average particle diameter of 100 nm).

The obtained composite ($Y^{91}$-2b) in an amount of 4.0 g was taken out, 0.033 g of LiOH and 0.029 g (corresponding to 0.5 mass % expressed in terms of amount of LiF supported in positive electrode active substance for sodium ion secondary cell) of ammonium fluoride, and 5 mL of water were then mixed therewith, and the resultant mixture was stirred for 1 hour and then pyrolyzed at 700° C. for 1 hour under the reducing atmosphere to obtain a positive electrode active substance ($NaFe_{0.2}Mn_{0.8}PO_4$, amount of carbon=2.4 mass %, amount of LiF=0.5 mass %) for a sodium ion secondary cell.

Example 9-2

A positive electrode active substance ($NaFe_{0.2}Mn_{0.8}PO_4$, amount of carbon=2.4 mass %, amount of LiF=1.0 mass %) for a sodium ion secondary cell was obtained in the same manner as in Example 9-1 except that the amount of LiOH added to the composite ($Y^{91}$-2b) was changed to 0.066 g, and the amount of ammonium fluoride added to the composite ($Y^{91}$-2b) was changed to 0.059 g (corresponding to 1.0 mass % expressed in terms of amount of LiF supported in positive electrode active substance for sodium ion secondary cell).

Example 9-3

A positive electrode active substance ($NaFe_{0.2}Mn_{0.8}PO_4$, amount of carbon=2.4 mass %, amount of LiF=2.0 mass %) for a sodium ion secondary cell was obtained in the same manner as in Example 9-1 except that the amount of LiOH added to the composite ($Y^{91}$-2b) was changed to 0.132 g, and the amount of ammonium fluoride added to the composite ($Y^{91}$-2b) was changed to 0.118 g (corresponding to 2.0 mass % expressed in terms of amount of LiF supported in positive electrode active substance for sodium ion secondary cell).

Example 9-4

A positive electrode active substance ($NaFe_{0.2}Mn_{0.8}PO_4$, amount of carbon=2.4 mass %, amount of $AlF_3$=2.0 mass %) for a sodium ion secondary cell was obtained in the same manner as in Example 9-1 except that 0.078 g of $Al(OH)_3$ in place of LiOH added to the composite ($Y^{91}$-2b) was added, and the amount of ammonium fluoride added to the composite ($Y^{91}$-2b) was changed to 0.353 g (corresponding to 2.0 mass % expressed in terms of amount of $AlF_3$ supported in positive electrode active substance for sodium ion secondary cell).

Example 9-5

A positive electrode active substance ($NaFe_{0.2}Mn_{0.8}PO_4$, amount of carbon=2.4 mass %, amount of $MgF_3$=2.0 mass %) for a sodium ion secondary cell was obtained in the same manner as in Example 9-1 except that 0.277 g of $Mg(CH_3COO)_2.4H_2O$ in place of LiOH added to the composite ($Y^{91}$-2b) was added, and the amount of ammonium fluoride added to the composite ($Y^{91}$-2b) was changed to 0.236 g (corresponding to 2.0 mass % expressed in terms of amount of $MgF_3$ supported in positive electrode active substance for sodium ion secondary cell).

Comparative Example 9-1

A positive electrode active substance ($NaFe_{0.2}Mn_{0.8}PO_4$, amount of carbon=2.4 mass %, amount of LiF=6.0 mass %) for a sodium ion secondary cell was obtained in the same manner as in Example 9-1 except that the amount of LiOH added to the composite ($Y^{91}$-2b) was changed to 0.396 g, and the amount of ammonium fluoride added to the composite ($Y^{91}$-2b) was changed to 0.353 g (corresponding to 6.0 mass % expressed in terms of amount of LiF supported in positive electrode active substance for sodium ion secondary cell).

Comparative Example 9-2

A positive electrode active substance ($NaFe_{0.2}Mn_{0.8}PO_4$, amount of carbon=2.4 mass %, amount of metal fluoride=0.0 mass %) for a sodium ion secondary cell was obtained in the same manner as in Example 9-1 except that the metal fluoride was not added.

<<Measurement of Amount of Adsorbed Water and Evaluation of Charge and Discharge Properties Using Secondary Cells>>

The measurement of the amount of the adsorbed water and the evaluation of the charge and discharge properties using the secondary cells were conducted for each positive electrode active substance obtained in Examples 7-1 to 9-5 and Comparative Examples 7-1 to 9-2 in the same manner as in Examples 1-1 to 3-2 and Comparative Examples 1-1 to 3-2.

The results are shown in Tables 6 to 7.

TABLE 6

| | Amount supported in 100 mass % of active substance (mass %) | | |
|---|---|---|---|
| | Cellulose nanofiber (expressed in terms of carbon atoms) | Metal fluoride | 250° C. Amount of water (ppm) |
| Example 7-1 | 2.0 | LiF 0.5 | 928 |
| Example 7-2 | 2.0 | LiF 1.0 | 285 |
| Example 7-3 | 2.0 | LiF 2.0 | 262 |
| Example 7-4 | 2.0 | AlF$_3$ 2.0 | 321 |
| Example 7-5 | 2.0 | MgF$_2$ 2.0 | 283 |
| Comparative Example 7-1 | 2.0 | LiF 6.0 | 359 |
| Comparative Example 7-2 | 2.0 | 0.0% | 2157 |
| Example 8-1 | 7.2 | LiF 0.5 | 980 |
| Example 8-2 | 7.2 | LiF 1.0 | 620 |
| Example 8-3 | 7.2 | LiF 2.0 | 480 |
| Example 8-4 | 7.2 | AlF$_3$ 2.0 | 620 |
| Example 8-5 | 7.2 | MgF$_2$ 2.0 | 480 |
| Comparative Example 8-1 | 7.2 | LiF 6.0 | 590 |
| Comparative Example 8-2 | 7.2 | 0.0 | 3000 |
| Example 9-1 | 2.4 | LiF 0.5 | 860 |
| Example 9-2 | 2.4 | LiF 1.0 | 240 |
| Example 9-3 | 2.4 | LiF 2.0 | 210 |
| Example 9-4 | 2.4 | AlF$_3$ 2.0 | 290 |
| Example 9-5 | 2.4 | MgF$_2$ 2.0 | 220 |
| Comparative Example 9-1 | 2.4 | LiF 6.0 | 340 |
| Comparative Example 9-2 | 2.4 | 0.0 | 1820 |

TABLE 7

| | Initial discharge capacity at 1 C (mAh/g) | Capacity retention rate (%) |
|---|---|---|
| Example 7-1 | 152 | 93 |
| Example 7-2 | 150 | 95 |
| Example 7-3 | 150 | 94 |
| Example 7-4 | 151 | 94 |
| Example 7-5 | 151 | 95 |
| Comparative Example 7-1 | 110 | 83 |
| Comparative Example 7-2 | 151 | 91 |
| Example 8-1 | 202 | 34 |
| Example 8-2 | 205 | 35 |
| Example 8-3 | 210 | 38 |
| Example 8-4 | 205 | 36 |
| Example 8-5 | 208 | 38 |
| Comparative Example 8-1 | 190 | 20 |
| Comparative Example 8-2 | 201 | 23 |
| Example 9-1 | 118 | 92 |
| Example 9-2 | 126 | 95 |
| Example 9-3 | 128 | 96 |
| Example 9-4 | 126 | 95 |
| Example 9-5 | 128 | 96 |
| Comparative Example 9-1 | 114 | 88 |
| Comparative Example 9-2 | 115 | 89 |

From the above-mentioned results, it found that the positive electrode active substances of Examples can reduce the amount of the adsorbed water more surely and can exhibit more excellent performance in the obtained cells than the positive electrode active substances of Comparative Examples.

The invention claimed is:

1. A positive electrode active substance, comprising:
a pyrolyzed composite of a compound of formula (A), (B), or (C);
carbon obtained by carbonizing a cellulose nanofiber; and
one material selected from the group consisting of 0.3 to 5 mass % of graphite, 0.1 to 4 mass % of carbon obtained by carbonizing a water-soluble carbon material, and 0.1 to 5 mass % of a metal fluoride:

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, and c each represent a number satisfying $0.1 \leq a \leq 0.9$, $0.1 \leq b \leq 0.9$, $0 < c \leq 0.1$, $2a+2b+(\text{valence of } M^1) \times c = 2$;

$$Li_2Fe_dMn_eM^2_fSiO_4 \qquad (B)$$

wherein $M^2$ represents Al, Zn, V, or Zr, and d, e, and f each represent a number satisfying $0.1 \leq d \leq 0.6$, $0.1 \leq e \leq 0.6$, $0.05 \leq f \leq 0.4$, $2d+2e+(\text{valence of } M^2) \times f = 2$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 < g \leq 1$, $0.5 \leq h < 1$, $0 < i \leq 0.3$, $2g+2h+(\text{valence of } Q) \times i = 2$;

wherein
the compound of formula (A), (B) or (C) has an olivine-type structure, and
a surface of the compound of formula (A), (B), or (C) is completely covered by the carbon obtained by carbonizing a cellulose nanofiber and the graphite, carbonized product of the water-soluble carbon material or metal fluoride.

2. The positive electrode active substance according to claim 1, wherein an amount of the carbon obtained by carbonizing a cellulose nanofiber is 0.5 to 15 mass % expressed in terms of carbon atoms.

3. The positive electrode active substance according to claim 1, which comprises 0.3 to 5 mass % of graphite and is obtained by adding the graphite to the compound of formula (A), (B), or (C); and carbon obtained by carbonizing a cellulose nanofiber and conducting mixing treatment for 6 to 90 minutes while applying compressive force and shear force, wherein a mass ratio of an amount of the graphite added to an amount of the cellulose nanofiber expressed in terms of carbon atoms, (graphite/cellulose nanofiber), is 0.08 to 6.

4. The positive electrode active substance according to claim 1, which comprises 0.1 to 4 mass % of carbon obtained by carbonizing a water-soluble carbon material and the water-soluble carbon material is supported on the composite as carbon obtained by subjecting the water-soluble carbon material and the compound of formula (A), (B), or (C); and carbon obtained by carbonizing a cellulose nanofiber to wet mixing and then carbonizing the resulting mixture.

5. The positive electrode active substance according to claim 4, wherein the water-soluble carbon material is at least one selected from the group consisting of saccharides, polyols, polyethers, and organic acids.

6. The positive electrode active substance according to claim 1, which comprises 0.1 to 5 mass % of a metal fluoride and the metal fluoride is supported on the composite by subjecting the compound of formula (A), (B), or (C); and carbon obtained by carbonizing a cellulose nanofiber and a precursor of the metal fluoride to wet mixing.

7. The positive electrode active substance according to claim 6, wherein:
- a metal of the metal fluoride is selected from the group consisting of lithium, sodium, magnesium, calcium, and aluminum; and
- a precursor of the metal fluoride comprises: a fluorine compound selected from the group consisting of ammonium fluoride, hydrofluoric acid, and hypofluorous acid; and a metal compound selected from the group consisting of metal acetates, metal nitrates, metal lactates, metal oxalates, metal hydroxides, metal ethoxides, metal isopropoxides, and metal butoxides.

8. The positive electrode active substance according to claim 1, wherein the composite comprising the compound and the carbon obtained by carbonizing a cellulose nanofiber is obtained by subjecting a slurry comprising:
- a lithium compound or a sodium compound;
- a compound comprising $M^1$, $M^2$ or $Q_i$;
- a phosphoric acid compound or a silicic acid compound;
- an iron compound and a manganese compound; and
- a cellulose nanofiber to hydrothermal reaction.

9. A method for producing a positive electrode active substance, the positive electrode active substance comprising 0.3 to 5 mass % of graphite supported on a composite comprising: a compound of formula (A), (B), or (C):

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, c each represent a number satisfying $0.1 \le a < 0.9$, $0.1 \le b \le 0.9$, $0 < c \le 0.1$, $2a+2b+(\text{valence of } M^1) \times c = 2$;

$$Li_2Fe_dMn_eM^2_fSiO_4 \qquad (B)$$

wherein $M^2$ represents Al, Zn, V, or Zr, and d, e, and f each represent a number satisfying $0.1 \le d \le 0.6$, $0.1 \le e \le 0.6$, $0.05 \le f \le 0.4$, $2d+2e+(\text{valence of } M^2) \times f = 2$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 < g \le 1$, $0.5 \le h < 1$, $0 < i \le 0.3$, $2g+2h+(\text{valence of } Q) \times i = 2$;
wherein the compound of formula (A), (B) or (C) has an olivine-type structure; and
carbon obtained by carbonizing a cellulose nanofiber, the method comprising:
(I-1) mixing a phosphoric acid compound or a silicic acid compound with a mixture (X-1) comprising: a lithium compound or a sodium compound; a compound comprising $M^1$, $M^2$ or $Q_i$ and a cellulose nanofiber, thereby obtaining a composite (X-1);
(II-1) subjecting slurry (Y-1) comprising: the obtained composite (X-1); and a metal salt comprising an iron compound and a manganese compound to hydrothermal reaction, thereby obtaining a composite (Y-1);
(III-1) adding the graphite to the obtained composite (Y-1) to conduct mixing for 6 to 90 minutes while applying compressive force and shear force, thereby obtaining a composite (Z-1); and
(IV-1) pyrolyzing the obtained composite (Z-1) in a reducing atmosphere or an inert atmosphere.

10. A method for producing a positive electrode active substance, the positive electrode active substance comprising 0.1 to 4 mass % of carbon obtained by carbonizing a water-soluble carbon material, or 0.1 to 5 mass % of a metal fluoride supported on a composite comprising
a compound of formula (A), (B), or (C):

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, c each represent a number satisfying $0.1 \le a < 0.9$, $0.1 \le b \le 0.9$, $0 < c \le 0.1$, $2a+2b+(\text{valence of } M^1) \times c = 2$;

$$Li_2Fe_dMn_eM^2_fSiO_4 \qquad (B)$$

wherein $M^2$ represents Al, Zn, V, or Zr, and d, e, and f each represent a number satisfying $0.1 \le d \le 0.6$, $0.1 \le e \le 0.6$, $0.05 \le f \le 0.4$, $2d+2e+(\text{valence of } M^2) \times 2$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 < g \le 1$, $0.5 \le h < 1$, $0 < i \le 0.3$, $2g+2h+(\text{valence of } Q) \times i = 2$;
wherein the compound of formula (A), (B) or (C) has an olivine-type structure; and
carbon obtained by carbonizing a cellulose nanofiber, the method comprising:
(I-2) mixing a phosphoric acid compound or a silicic acid compound with a mixture (X-2) comprising: a lithium compound or a sodium compound; a compound comprising $M^1$, $M^2$ or $Q_i$ and a cellulose nanofiber, thereby obtaining a composite (X-2);
(II-2) subjecting slurry (Y-2) comprising: the obtained composite (X-2); and a metal salt comprising an iron compound and a manganese compound to hydrothermal reaction, thereby obtaining a composite (Y-2); and
(III-2) adding 0.1 to 16 mass parts of a water-soluble organic compound to the obtained composite (Y-2) based on 100 mass parts of the composite (Y-2) or adding 0.1 to 40 mass parts of a precursor of the metal fluoride to the obtained composite (Y-2) based on 100 mass parts of the composite (Y-2) and conducting wet mixing, and then pyrolyzing.

11. The positive electrode active substance according to claim 1, wherein
when water is adsorbed at a temperature of 20° C. and a relative humidity of 50% until an equilibrium is achieved,
when the compound comprising iron and manganese is of formula (A) or (C), the amount of the absorbed water in the positive electrode active substance is 1,200 ppm or less and when the compound comprising iron and manganese is of formula (B), the amount of the absorbed water in the positive electrode active substance is 2,500 ppm or less.

* * * * *